US011511554B2

(12) United States Patent
Mikoshiba et al.

(10) Patent No.: US 11,511,554 B2
(45) Date of Patent: Nov. 29, 2022

(54) LEARNING DEVICE, FIBROUS FEEDSTOCK RECYCLING APPARATUS, LEARNING METHOD, AND STORAGE MEDIUM THAT STABLY TRANSPORTS TRANSPORT TARGET MATTER

(71) Applicant: SEIKO EPSON CORPORATION, Tokyo (JP)

(72) Inventors: Takao Mikoshiba, Shiojiri (JP); Keita Komatsu, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 574 days.

(21) Appl. No.: 16/697,325

(22) Filed: Nov. 27, 2019

(65) Prior Publication Data

US 2020/0165092 A1 May 28, 2020

(30) Foreign Application Priority Data

Nov. 28, 2018 (JP) ............................ JP2018-222341

(51) Int. Cl.

| | |
|---|---|
| ***B65H 23/18*** | (2006.01) |
| ***B41J 15/04*** | (2006.01) |
| ***B21C 47/00*** | (2006.01) |
| ***G06N 20/00*** | (2019.01) |
| ***D21F 3/08*** | (2006.01) |
| ***D21F 7/00*** | (2006.01) |
| ***G01B 11/06*** | (2006.01) |
| ***G05B 13/02*** | (2006.01) |

(52) U.S. Cl.
CPC ........... *B41J 15/046* (2013.01); *B21C 47/003* (2013.01); *D21F 3/08* (2013.01); *D21F 7/006* (2013.01); *G01B 11/06* (2013.01); *G05B 13/0265* (2013.01); *G06N 20/00* (2019.01)

(58) Field of Classification Search
None
See application file for complete search history.

(56) References Cited

U.S. PATENT DOCUMENTS

2014/0053745 A1* 2/2014 Dawley .................. B41F 13/03 101/228
2015/0239234 A1* 8/2015 Regelsberger ...... B41F 33/0036 101/481

FOREIGN PATENT DOCUMENTS

| | | |
|---|---|---|
| CN | 103625109 A | 3/2014 |
| CN | 205329249 U | 6/2016 |
| JP | 2004-058518 A | 2/2004 |

(Continued)

*Primary Examiner* — Andrew H Lam
(74) *Attorney, Agent, or Firm* — Oliff PLC

(57) ABSTRACT

A control device using, as a learning target, a transporting apparatus, a rotation control section which controls at least one of a rotation speed of a first roller and a rotation speed of a second roller, and a position detection section which detects a position of the transport target matter, the control device including a state variable acquisition section which acquires a state variable and a detection result of the position detection section, the state variable being based on information of a state of the transport target matter and information of an environment to which the transport target matter is exposed, and a learning section which learns a control expression for calculating a control value of the rotation control section based on a dataset containing the state variable acquired by the state variable acquisition section and the detection result of the position detection section.

16 Claims, 13 Drawing Sheets

(56) References Cited

FOREIGN PATENT DOCUMENTS

| | | | |
|---|---|---|---|
| JP | 2013-087370 | A | 5/2013 |
| JP | 2017-214173 | A | 12/2017 |
| JP | 2018-086701 | A | 6/2018 |

* cited by examiner

<table>
<tr><th>ROTATION SPEED OF PRESSURIZING ROLLER</th><th>ROTATION SPEED OF HEATING ROLLER</th><th>ROTATION SPEED OF TRANSPORT ROLLER</th></tr>
<tr><td rowspan="4">Vp</td><td rowspan="2">Vhs</td><td>Vc1</td></tr>
<tr><td>Vc2</td></tr>
<tr><td rowspan="2">Vhf</td><td>Vc3</td></tr>
<tr><td>Vc4</td></tr>
</table>

LEARNING DEVICE, FIBROUS FEEDSTOCK RECYCLING APPARATUS, LEARNING METHOD, AND STORAGE MEDIUM THAT STABLY TRANSPORTS TRANSPORT TARGET MATTER

The present application is based on, and claims priority from JP Application Serial Number 2018-222341, filed Nov. 28, 2018, the disclosure of which is hereby incorporated by reference herein in its entirety.

BACKGROUND

1. Technical Field

The present disclosure relates to a learning device, a fibrous feedstock recycling apparatus, a learning method, and a storage medium.

2. Related Art

In the related art, there is known an apparatus provided with a transporting mechanism which transports a sheet-like target recording medium using rollers (for example, refer to JP-A-2004-58518). The apparatus described in JP-A-2004-58518 includes a sensor which detects slack in a target recording medium, driving the rollers at a low speed in a state in which slack is not detected in the target recording medium by the sensor, and switching to driving the rollers at a medium speed when slack is detected.

In the configuration described in JP-A-2004-58518, there is a problem in that transporting of a target recording medium becomes unstable due to fluctuation in the speed of rollers. For example, the influence of individuality or a disturbance in the motor or the like which drives the rollers may become factors in causing the speed of the rollers to fluctuate. It is difficult to avoid speed fluctuation in the rollers caused by such factors.

SUMMARY

According to an aspect of the present disclosure, there is provided a learning device using, as a learning target, a transporting apparatus provided with a first roller which transports web-like or sheet-like transport target matter and a second roller disposed downstream of the first roller in a transport path of the transport target matter, a rotation control section which controls at least one of a rotation speed of the first roller and a rotation speed of the second roller, and a position detection section which detects a position of the transport target matter in a direction intersecting the transport path between the first roller and the second roller, the learning device including a state variable acquisition section which acquires a state variable and a detection result of the position detection section, the state variable being based on information of a state of the transport target matter and information of an environment to which the transport target matter is exposed, and a learning section which learns an operational expression for calculating a control value of the rotation control section based on a dataset containing the state variable acquired by the state variable acquisition section and the detection result of the position detection section.

The learning device may be configured to further include an evaluation section which evaluates a transporting state of the transport target matter based on a detection result of the position detection section and the learning section may perform learning using the dataset containing an evaluation result of the evaluation section.

The learning device may be configured to further include a communication section which communicates with the transporting apparatus and the state variable acquisition section may acquire the state variable and the detection result of the position detection section from information received by the communication section.

In the learning device, a configuration may be adopted in which the state variable acquisition section acquires information relating to a humidity to which the transport target matter is exposed as the state variable.

In the learning device, a configuration may be adopted in which the state variable acquisition section acquires information relating to a temperature to which the transport target matter is exposed as the state variable.

In the learning device, a configuration may be adopted in which the operational expression is an expression for calculating the control value relating to the rotation speed of the second roller.

According to another aspect of the present disclosure, there is provided a fibrous feedstock recycling apparatus including a web forming section which forms a web from a feedstock containing fibers, a web transport section which transports the web formed by the web forming section, and a control section, in which the web transport section includes a first roller which transports the web and a second roller disposed downstream of the first roller in a transport path of the web, and a position detection section which detects a position of the web in a direction intersecting the transport path between the first roller and the second roller, the control section includes a rotation control section which controls at least one of a rotation speed of the first roller and a rotation speed of the second roller, a state variable acquisition section which acquires a state variable relating to a state of at least one of the web forming section and the web transport section, and a learning section which learns an operational expression for calculating a control value of the rotation control section based on a dataset containing the state variable acquired by the state variable acquisition section and a detection result of the position detection section, and the control section controls at least one of the first roller and the second roller using the rotation control section based on the control value calculated based on the operational expression.

In the fibrous feedstock recycling apparatus, a configuration may be adopted in which the control value relating to the rotation speed of the second roller is calculated based on the operational expression.

In the fibrous feedstock recycling apparatus, a configuration may be adopted in which the position detection section includes a proximity sensor installed between the first roller and the second roller or an encoder.

In the fibrous feedstock recycling apparatus, a configuration may be adopted in which the state variable acquisition section acquires a humidity of the transport path as the state variable.

In the fibrous feedstock recycling apparatus, a configuration may be adopted in which the state variable acquisition section acquires a temperature of the transport path as the state variable.

The fibrous feedstock recycling apparatus may be configured to further include a pressure sensor which detects a pressure of exhaust that carries the feedstock and the state variable acquisition section may acquire a detection value of the pressure sensor as the state variable.

In the fibrous feedstock recycling apparatus, a configuration may be adopted in which the web forming section is provided with a hollow sieve portion which sieves a material containing fibers, an accumulating section which accumulates the material sieved by the sieve portion, and an ultrasonic wave sensor which detects the material in an inner portion of the sieve portion, and the state variable acquisition section acquires a detection value of the ultrasonic wave sensor as the state variable.

In the fibrous feedstock recycling apparatus, a configuration may be adopted in which the web forming section is provided with a thickness measuring section which measures a thickness of the web, and the state variable acquisition section acquires a measurement value of the thickness measuring section as the state variable.

According to still another aspect of the present disclosure, there is provided a learning method using, as a learning target, a transporting apparatus provided with a first roller which transports web-like or sheet-like transport target matter and a second roller disposed downstream of the first roller in a transport path of the transport target matter, in which the transporting apparatus controls a rotation speed of the first roller and a rotation speed of the second roller, the method including detecting a position of the transport target matter in a direction intersecting the transport path between the first roller and the second roller, acquiring a state variable which changes a state of the transport target matter, and learning an operational expression for calculating a control value of the rotation speeds of the first roller and the second roller based on a dataset containing the detected position of the transport target matter between the first roller and the second roller and the state variable.

According to still another aspect of the present disclosure, there is provided a non-transitory computer-readable storage medium storing a program configured to be executed by a computer which is provided with a first roller which transports web-like or sheet-like transport target matter and a second roller disposed downstream of the first roller in a transport path of the transport target matter, and which controls a rotation speed of the first roller and a rotation speed of the second roller, the program including an operational expression for calculating a control value of the rotation speeds of the first roller and the second roller, the operational expression being learned based on a dataset containing a position of the transport target matter in a direction intersecting the transport path detected between the first roller and the second roller and a state variable which changes a state of the transport target matter, and controlling the rotation speeds of the first roller and the second roller based on the control value calculated based on the operational expression.

BRIEF DESCRIPTION OF THE DRAWINGS

FIG. 6 is a schematic diagram illustrating a configuration example of speed setting data.

DESCRIPTION OF EXEMPLARY EMBODIMENTS

Hereinafter, a detailed description will be given of favorable embodiments of the present disclosure using the drawings. The embodiments described hereinafter are not to be construed as limiting the content of the present disclosure. All of the configurations which are described hereinafter are not necessarily essential constituent elements of the present disclosure.

1. First Embodiment

1-1. Overall Configuration of Control System

Figure 1:
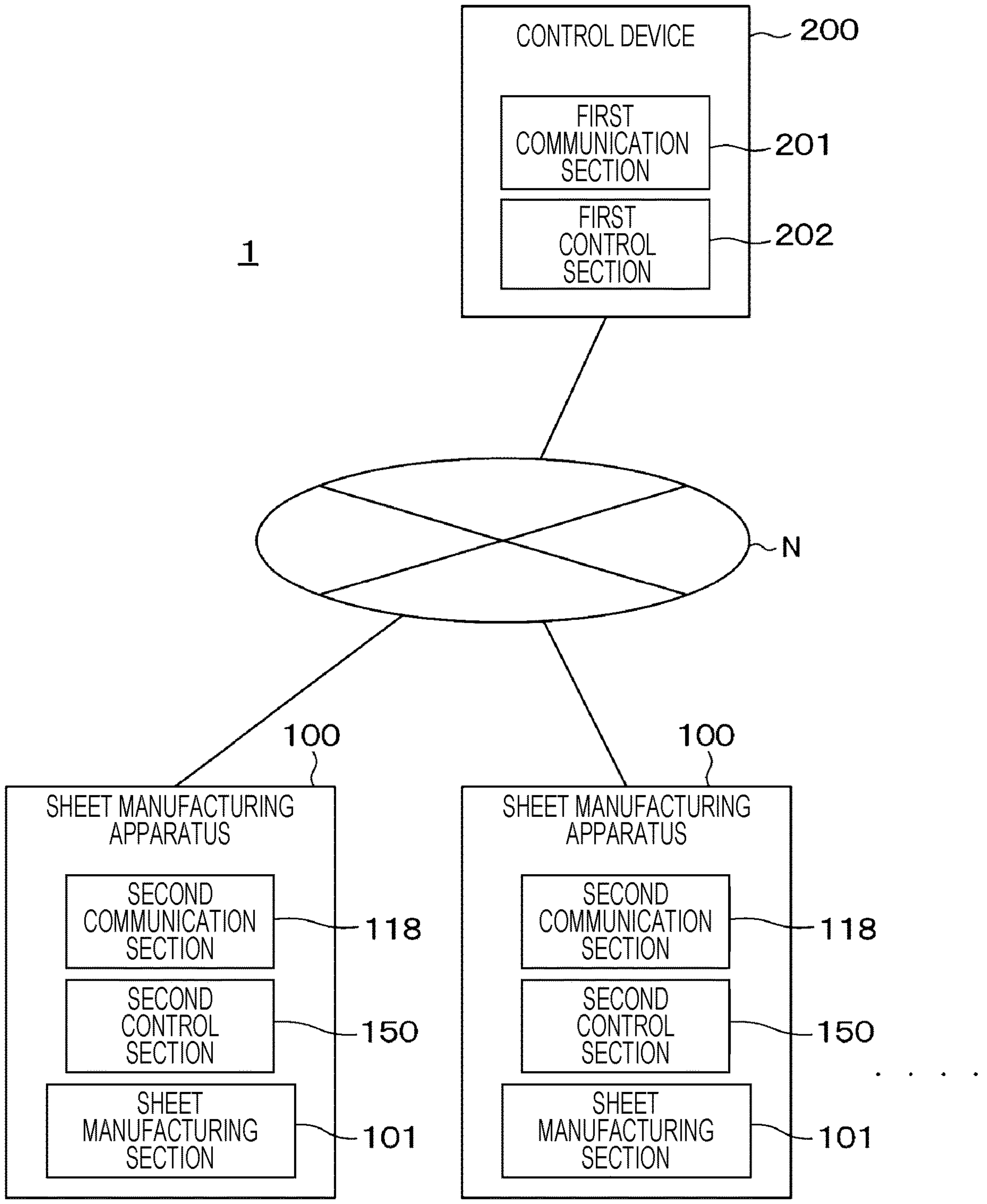
FIG. 1 is a configuration diagram of a control system.

FIG. 1 is a diagram illustrating the configuration of a control system 1 according to the embodiment applied to the present disclosure.

The control system 1 is provided with one or a plurality of sheet manufacturing apparatuses 100 and a control device 200 and the sheet manufacturing apparatus 100 and the control device 200 are connected to each other by a communication network N to be capable of communication.

The sheet manufacturing apparatus 100 includes a sheet manufacturing section 101 and a second control section 150 which controls the sheet manufacturing section 101 and uses the sheet manufacturing section 101 to manufacture a sheet S from a feedstock MA (described later). The sheet manufacturing apparatus 100 corresponds to a fibrous feedstock recycling apparatus of the present disclosure.

The sheet manufacturing apparatus 100 is provided with a second communication section 118 which executes communication via the communication network N. The second control section 150 controls the second communication section 118 to execute the communication with the control device 200. The second control section 150 controls the sheet manufacturing section 101. The second control section 150 uses a control expression in the control of the sheet manufacturing section 101. The control expression contains an operational expression, a table, an algorithm, or the like which calculates a value necessary for the control of the sheet manufacturing section 101. The sheet manufacturing apparatus 100 stores the control expression to be used in an initial state and uses the control expression to start the manufacturing of the sheet S.

The sheet manufacturing apparatus 100 is provided with a plurality of sensors which detect the states of each part of the sheet manufacturing section 101. The second control section 150 acquires a detection value of a sensor and uses the second communication section 118 to transmit the detection value to the control device 200 as state information to be used in the processes of generating and updating the control expression.

The control device 200 is provided with a first communication section 201 which executes communication via the communication network N and a first control section 202 which controls the first communication section 201.

The first control section 202 updates the control expression which is used by the sheet manufacturing apparatus 100 based on the received state information when the first control section 202 receives the state information using the first communication section 201. The first control section 202 transmits the update data for updating the control expression to the sheet manufacturing apparatus 100 using the first communication section 201.

The second control section 150 of the sheet manufacturing apparatus 100 uses the received update data to update the control expression when the second control section 150 receives the update data from the control device 200. Accordingly, the control expression which controls the sheet manufacturing section 101 is updated to reflect the state of the sheet manufacturing section 101.

Although two of the sheet manufacturing apparatuses 100 are illustrated in FIG. 1, there is no limit to the number of the sheet manufacturing apparatuses 100 provided in the control system 1. When the control system 1 is provided with a plurality of the sheet manufacturing apparatuses 100, the control device 200 identifies each of the sheet manufacturing apparatuses 100 contained in the control system 1 using identification information to transmit and receive commands to the sheet manufacturing apparatuses 100. It is possible to use an ID, a network address, or the like which is given distinctly to each individual sheet manufacturing apparatus 100 in advance for the identification information.

The communication network N is a network configured using a public network, a private line, or another communication line and various communication facilities and the specific mode of the communication network N is not limited. For example, the communication network N may be a wide-area network and may be a local area network installed in the inner portion of a building. The communication network N may be a configuration including a wireless communication line.

1-2. Configuration of Sheet Manufacturing Apparatus

Figure 2:
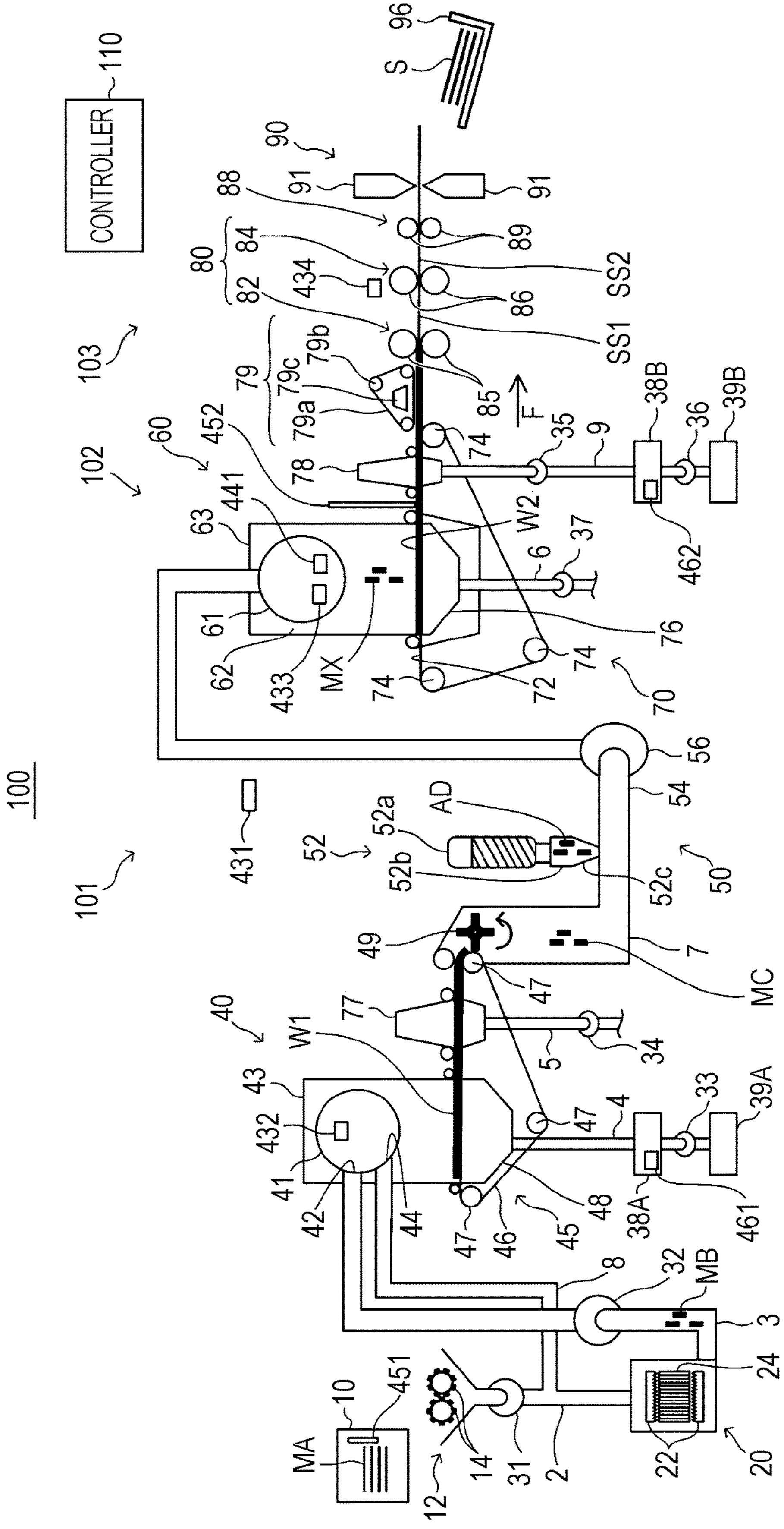
FIG. 2 is a view illustrating a configuration of a sheet manufacturing apparatus.

FIG. 2 is a view illustrating a configuration of the sheet manufacturing apparatus 100. The sheet manufacturing apparatuses 100 which configure the control system 1 may have a shared configuration.

The sheet manufacturing apparatus 100 fibrizes a feedstock MA containing fibers to execute a recycling process which recycles the feedstock MA into a new sheet S. The feedstock MA may be any feedstock containing fibers. For example, it is possible to use wood-based pulp material, kraft pulp, old paper, synthetic pulp, or the like.

The sheet manufacturing apparatus 100 is capable of producing a plurality of kinds of the sheet S and, for example, is capable of adjusting the bonding strength and the whiteness of the sheet S, and of adding functions such as color, scent, and flame-proofing according to purpose by mixing additives into the feedstock MA. The sheet manufacturing apparatus 100 is capable of adjusting the density, thickness, size, and shape of the sheet S. Representative examples of the sheet S include paper plate-like and the like in addition to sheet-like products such as printing paper of standard sizes such as A4 and A3, cleaning sheets such as floor cleaning sheets, sheets for oil dirtying, and toilet cleaning sheets.

The sheet manufacturing apparatus 100 is provided with the sheet manufacturing section 101 which manufactures the sheet S. The sheet manufacturing section 101 is provided with a supply section 10, a crushing section 12, a defibrating section 20, a sorting section 40, a first web forming section 45, a rotating body 49, a mixing section 50, a dispersing section 60, a second web forming section 70, a web moving section 79, a molding section 80, a transport section 88, and a cutting section 90. These sections execute a manufacturing step of manufacturing the sheet S from the feedstock MA in the order the sections are listed. The sheet manufacturing apparatus 100 forms a pressurized sheet SS1 and a heated sheet SS2 as intermediate products in the manufacturing step of the sheet S.

The sheet manufacturing section 101 contains a web forming section 102 and a web transport section 103. The web forming section 102 is a functional section which forms a second web W2. Specifically, the web forming section 102 contains the dispersing section 60 and the second web forming section 70. In the manufacturing step of the sheet S, the sections from the supply section 10 to the web moving section 79 may be contained in the web forming section 102, and in this case, the web forming section 102 forms the second web W2 from the feedstock MA.

The web transport section 103 transports the second web W2 formed by the second web forming section 70. The web transport section 103 contains the molding section 80 and the transport section 88.

The cutting section 90 which executes a step after the web transport section 103 may be contained in the sheet manufacturing section 101.

The supply section 10 is an automatic feeding device which stores the feedstock MA and continually feeds the feedstock MA into the crushing section 12. The feedstock MA may be any feedstock containing fibers, for example, old paper, waste paper, or pulp sheets.

The crushing section 12 is provided with a crushing blade 14 which cuts the feedstock MA supplied by the supply section 10, the crushing section 12 using the crushing blade 14 to cut the feedstock MA in the air to obtain rectangular shreds several cm in size. The shape and size of the shreds are arbitrary. It is possible to use a shredder, for example, for the crushing section 12. A tube 2 including a first intermediate blower 31 is connected to the crushing section 12.

The first intermediate blower 31 is provided with, for example, a motor, blades driven to rotate by the motor, and a case storing the blades. In the present embodiment, other blowers may also have a similar configuration. The first intermediate blower 31 generates an air current in the inner portion of the tube 2 heading from the crushing section 12 toward the defibrating section 20. The feedstock MA cut by the crushing section 12 is transported to the defibrating section 20 through the tube 2 by the air current generated by the first intermediate blower 31.

The defibrating section 20 defibrates the crushed pieces that are cut by the crushing section 12. Defibration is processing in which the feedstock MA in a state in which a plurality of fibers is bound together is untangled into single or low numbers of fibers. It is possible to refer to the feedstock MA as defibration target matter. It is possible to anticipate an effect of causing matter such as resin granules, ink, toner, and bleeding inhibitor adhered to the feedstock MA to separate from the fibers due to the defibrating section 20 defibrating the feedstock MA. The matter which passes the defibrating section 20 is referred to as defibrated matter. In addition to the defibrated fibers which are untangled, the defibrated matter may include resin granules which separate from the fibers when untangling the fibers, colorants such as ink and toner, and additives such as a bleeding inhibitor and paper strengthener. The resin granules contained in the defibrated matter are a resin in which the fibers in a plurality of fibers are mixed to bond to each other during the manufacturing of the feedstock MA. The shape of the fibers contained in the defibrated matter is a string shape, flat string shape, or the like. The fibers contained in the defibrated matter may be present in an independent state of not being tangled with other fibers. Alternatively, the fibers may be tangled with other untangled defibrated matter to form a lump shape and be present in a state of forming so-called clumps.

The defibrating section 20 is a device that defibrates the crushed pieces cut by the crushing section 12 using a dry system. It is possible to configure the defibrating section 20 using a defibrator such as an impeller mill, for example. The defibrating section 20 of the present embodiment is a mill provided with a cylindrical stator 22 and a rotor 24 which rotates in the inner portion of the stator 22, defibrating blades being formed on the inner circumferential surface of the stator 22 the outer circumferential surface of the rotor 24. The crushed pieces are pinched between the stator 22 and the rotor 24 to be defibrated by the rotation of the rotor 24. The dry system indicates that the processes such as the defibrating are performed not in a liquid but in a gas such as in the air.

A tube 3 including a second intermediate blower 32 is connected to the defibrating section 20. The second intermediate blower 32 generates an air current in the inner portion of the tube 3 heading from the defibrating section 20 toward the sorting section 40. Defibrated matter MB defibrated by the defibrating section 20 is fed from the discharge port of the defibrating section 20 to the sorting section 40 through the tube 3 by the air current generated by the second intermediate blower 32.

The sorting section 40 sorts the components contained in the defibrated matter MB according to the size of the fibers. The size of the fibers mainly indicates the length of the fibers.

The sorting section 40 of the present embodiment includes a drum section 41 and a housing section 43 which stores the drum section 41. The drum section 41 is a so-called sieve such as a mesh having openings, a filter, or a screen, for example. Specifically, the drum section 41 has a cylindrical shape rotationally driven by a motor, and at least a portion of the circumferential surface is a mesh. The drum section 41 may be configured by a metal mesh, expanded metal in which a metal plate having cuts therein is stretched out, perforated metal, or the like. The drum section 41 is driven to rotate by a first drum drive section 325 (described later).

The defibrated matter MB reaches an inlet 42 through the tube 3 and is introduced to the inner portion of the drum section 41 from the inlet 42. Through the rotation of the drum section 41, the defibrated matter MB is divided into passed matter which passes through the openings in the drum section 41 and residue which does not pass through the openings. The passed matter which passes through the openings contains fibers, particles, and the like smaller than the openings and is a first sorted matter. The residue contains fibers, non-defibrated pieces, lumps, and the like larger than the openings and is referred to as a second sorted matter. The first sorted matter descents the inner portion in the housing section 43 toward the first web forming section 45. The second sorted matter is transported to the defibrating section 20 via a tube 8 from a discharge port 44 communicating with the inner portion of the drum section 41.

Instead of the sorting section 40, the sheet manufacturing apparatus 100 may be provided with a classifier which separates the first sorted matter and the second sorted matter. The classifier is a cyclone classifier, an elbow jet classifier, or an eddy classifier, for example.

The first web forming section 45 includes a mesh belt 46 positioned under the drum section 41 and forms a first web W1 by molding the first sorted matter separated by the sorting section 40 into a web-like form.

The first web forming section 45 includes the mesh belt 46, stretch rollers 47, and an aspiration section 48. The mesh belt 46 is an endless metal belt and bridges across the plurality of stretch rollers 47. One or more of the stretch rollers 47 is driven to rotate by a first belt drive section 326 (described later) and causes the mesh belt 46 to move. The mesh belt 46 goes around a track configured by the stretch rollers 47. A portion of the track of the mesh belt 46 is planar on the bottom of the drum section 41 and configures a planar surface of the mesh belt 46.

Multiple openings are formed in the mesh belt 46 and, of the first sorted matter which descends from the drum section 41, a component that is larger than the openings in the mesh belt 46 accumulates on the mesh belt 46. The component of the first sorted matter that is smaller than the openings in the mesh belt 46 passes through the openings. The component which passes through the openings in the mesh belt 46 is referred to as a third sorted matter, and, for example, contains fibers shorter than the openings in the mesh belt 46, resin granules separated from the fibers by the defibrating section 20, and particles including ink, toner, bleeding inhibitor, and the like.

A tube 4 is connected to the aspiration section 48 and a first dust-gathering blower 33 is provided on the tube 4. The first dust-gathering blower 33 generates an air current to aspirate the air from the aspiration section 48. In the tube 4, a first filter 38A is disposed upstream of the first dust-gathering blower 33 and a first exhaust box 39A is disposed downstream of the first dust-gathering blower 33. The first filter 38A gathers matter in the air which flows from the aspiration section 48 to the first dust-gathering blower 33. For example, the first filter 38A gathers a third sorted matter which passes through the openings in the mesh belt 46. The first exhaust box 39A includes an exhaust port and exhausts the air which passes through the first filter 38A to the outside of the sheet manufacturing apparatus 100. The first exhaust box 39A may be provided with a sound-canceling structure which reduces the operation sounds and the like of the first dust-gathering blower 33 which are emitted from the exhaust port.

Since the air current which is aspirated by the aspiration section 48 pulls the first sorted matter which descends from the drum section 41 toward the mesh belt 46, there is an effect of promoting accumulation.

The component which accumulates on the mesh belt 46 becomes web-like and configures the first web W1. In other words, the first web forming section 45 forms the first web W1 from the first sorted matter sorted by the sorting section 40.

The main component of the first web W1 is fibers larger than the openings in the mesh belt 46, of the components contained in the first sorted matter, and the first web W1 is formed in a soft state containing much air. The first web W1 is transported by the rotating body 49 together in accordance with the movement of the mesh belt 46.

A first mist moisture adjusting section 77 is disposed in a path in which the first web W1 is transported from the housing section 43 toward the rotating body 49. The first mist moisture adjusting section 77 is a mist system humidifier which turns water into a mist and supplies the mist toward the mesh belt 46. The first mist moisture adjusting section 77 is provided with a tank storing water and an ultrasonic transducer which turns the water into mist form, for example.

The water content of the first web W1 is adjusted due to the first mist moisture adjusting section 77 supplying the mist and it is possible to suppress the adherence of fibers to the mesh belt 46 caused by static electricity and the like are.

A tube 5 is disposed at a position facing the first mist moisture adjusting section 77 to interpose the mesh belt 46. The tip of the tube 5 is open facing the mesh belt 46 and a second dust-gathering blower 34 is provided on the tube 5. The second dust-gathering blower 34 is a blower which aspires air through the tube 5. The air passes through the mesh belt 46 and the first web W1 on the mesh belt 46 and is aspired due to the air current generated by the second dust-gathering blower 34. The mist supplied by the first mist moisture adjusting section 77 effectively adheres to the first web W1 due to the air current generated by the second dust-gathering blower 34 and there is an effect of the first web W1 being subjected to moisture adjustment. The side of the tube 5 that is downstream of the second dust-gathering blower 34 is connected to a second filter 38B (described later).

The rotating body 49 is provided with a plurality of plate-like blades and is driven to rotate by a rotating body drive section 327 (described later). The rotating body 49 is disposed at an end portion of the track of the mesh belt 46 and comes into contact with a location on the rotating body 49 at which the first web W1 transported by the mesh belt 46 protrudes from the mesh belt 46. The first web W1 is untangled by the rotating body 49 colliding with the first web W1, becomes small fiber lumps, passes through a tube 7, and is transported to the mixing section 50. The material obtained by cutting the first web W1 with the rotating body 49 is a material MC. The material MC is obtained by removing the third sorted matter from the first sorted matter and the main component of the material MC is fibers.

In this manner, the sorting section 40 and the first web forming section 45 have a function of separating the material MC mainly containing fibers from the defibrated matter MB.

An additive supply section 52 is a device which adds an additive material AD to a tube 54 carrying the material MC. An additive cartridge 52*a* which accumulates the additive material AD is set in the additive supply section 52. The additive cartridge 52*a* is a tank storing the additive material AD and may be attachable and detachable with respect to the additive supply section 52. The additive supply section 52 is provided with an additive dispensing section 52*b* which dispenses the additive material AD from the additive cartridge 52*a* and an additive feeding section 52*c* which discharges the additive material AD dispensed by the additive dispensing section 52*b* to the tube 54. The additive dispensing section 52*b* is provided with a feeder which sends the additive material AD to the additive feeding section 52*c*. The additive feeding section 52*c* is provided with a shutter capable of opening and closing and sends the additive material AD to the tube 54 by opening the shutter.

The additive material AD may contain a bonding agent for bonding a plurality of fibers together. The bonding agent is a synthetic resin or a natural resin, for example. The resin contained in the additive material AD is melted to bond the plurality of fibers together when passing through the molding section 80. The resin is a thermoplastic resin or a heat curing resin, for example, the resin is AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, polyether ether ketone, or the like. These resins may be used on their own or in a mixture, as appropriate.

The additive material AD may contain components other than the resin which bonds the fibers together. For example, depending on the kind of the sheet S to be manufactured, the additive material AD may contain a colorant for coloring the fibers, an aggregation inhibitor for preventing aggregation of the fibers and aggregation of the resin, a flame retardant for rendering the fibers and the like less susceptible to burning, and the like. The additive material AD may be fiber form and may be powder form.

The mixing section 50 mixes the material MC and the additive material AD together using a mixing blower 56. The tube 54 may be contained in the mixing section 50.

The mixing blower 56 generates an air current in the tube 54 joining the tube 7 to the dispersing section 60 and mixes the material MC and the additive material AD together. The mixture mixed in the mixing section 50 will be referred to as a mixture MX. The mixture MX is transported to the dispersing section 60 through the tube 54 by the air current generated by the mixing blower 56 and is introduced to the dispersing section 60.

The mixing blower 56 is provided with, for example, a motor, blades driven to rotate by the motor, and a case storing the blades in the same manner as the other blowers provided in the sheet manufacturing apparatus 100. The mixing blower 56 may be provided with, in addition to the blades generating the air current, a mixer which mixes the material MC and the additive material AD together.

The dispersing section 60 untangles the fibers of the mixture MX and causes the untangled fibers to descend onto the second web forming section 70 while dispersing the fibers in the atmosphere. In a case in which the additive material AD is fiber shaped, these fibers are also untangled by the dispersing section 60 and descend onto the second web forming section 70.

The dispersing section 60 includes a drum section 61 which serves as a sieve portion and a housing section 63 storing the drum section 61. The drum section 61 is a cylindrical structural body configured in the same manner as the drum section 41, for example. The drum section 61 is driven to rotate by a second drum drive section 328 (described later) and functions as a sieve. The drum section 61 has an opening and causes the mixture MX untangled by the rotation of the drum section 61 to descend from the opening. Accordingly, the mixture MX descends from the drum section 61 in an inner portion space of the housing section 63.

The second web forming section 70 is disposed below the drum section 61. The second web forming section 70 includes a mesh belt 72 which serves as an accumulating section, stretch rollers 74, and an aspiration section 76.

The mesh belt 72 is configured by an endless metal belt similar to the mesh belt 46 and bridges across a plurality of stretch rollers 74. One or more of the stretch rollers 74 is driven to rotate by a second belt drive section 329 (described later) and drives the mesh belt 72. The mesh belt 72 moves in a transport direction indicated by symbol F1 while going around a track configured by the stretch rollers 74. A portion of the track of the mesh belt 72 is planar on the bottom of the drum section 61 and configures a planar surface of the mesh belt 72.

Multiple openings are formed in the mesh belt 72 and, of the mixture MX which descends from the drum section 61, a component that is larger than the openings in the mesh belt 72 accumulates on the mesh belt 72. The component of the mixture MX that is smaller than the openings in the mesh belt 72 passes through the openings.

The tube 6 is connected to the aspiration section 76 and a collecting blower 37 is provided on the tube 6. The collecting blower 37 generates an air current to aspirate the air from the aspiration section 76. The aspiration section 76 uses the aspiration force of the collecting blower 37 to aspirate the air from the opposite side of the mesh belt 72 from the drum section 61. The component that passes through the openings in the mesh belt 72 is sucked up by the aspiration section 76. The air current aspirated by the aspiration section 76 pulls the mixture MX descending from the drum section 61 toward the mesh belt 72 to promote the accumulation of the mixture MX. The air current of the aspiration section 76 forms a downflow in the path in which the mixture MX descends from the drum section 61 and it is possible to anticipate an effect of preventing the tangling of the fibers while the fibers fall.

The side of the tube 4 that is downstream of the collecting blower 37 is connected to the tube 2 by a tube path (not illustrated). The air current which is aspirated from the aspiration section 76 by the collecting blower 37 contains, of the mixture MX, the component that passes through the mesh belt 72. This component is transported to the tube 2 by the collecting blower 37 and returns to the defibrating section 20.

In the transport path of the mesh belt 72, a second mist moisture adjusting section 78 is provided downstream of the dispersing section 60. The second mist moisture adjusting section 78 is a mist system humidifier which turns water into a mist and supplies the mist toward the mesh belt 72 in the same manner as the first mist moisture adjusting section 77. The second mist moisture adjusting section 78 supplies the mist to the second web W2 on the mesh belt 72. Accordingly, the water content of the second web W2 is adjusted and adherence of fibers to the mesh belt 72 caused by static electricity and the like is suppressed.

The second web W2 is peeled from the mesh belt 72 and transported to the molding section 80 by the web moving section 79. The web moving section 79 includes a mesh belt 79*a*, a roller 79*b*, and a suction mechanism 79*c*.

The suction mechanism 79*c* is provided with a blower (not illustrated) and generates an upward air current through the mesh belt 79*a* using the aspiration force of the blower. It is possible to configure the mesh belt 79*a* using an endless metal belt having openings similar to the mesh belt 46 and the mesh belt 72. The mesh belt 79*a* is moved by the rotation of the roller 79*b* and moves on a turning track. In the web moving section 79, the second web W2 separates from the mesh belt 72 and is adhered to the mesh belt 79*a* due to the aspiration force of the suction mechanism 79*c*. The second web W2 moves with the mesh belt 79*a* and is transported to the molding section 80.

The suction mechanism 79*c* is connected to the second filter 38B via a tube path (not illustrated).

A tube 9 is disposed at a position facing the second mist moisture adjusting section 78 to interpose the mesh belt 72. The tip of the tube 9 is open facing the mesh belt 72 and a third dust-gathering blower 35 is provided on the tube 9. The third dust-gathering blower 35 is a blower which aspires air through the tube 9. The air passes through the mesh belt 72 and the second web W2 on the mesh belt 72 and is aspired due to the air current generated by the third dust-gathering blower 35. The mist supplied by the second mist moisture adjusting section 78 effectively adheres to the second web W2 due to the air current generated by the third dust-gathering blower 35 and there is an effect of the second web W2 being subjected to moisture adjustment.

In the tube 9, the second filter 38B, a fourth dust-gathering blower 36, and a second exhaust box 39B are disposed downstream of the third dust-gathering blower 35. The fourth dust-gathering blower 36 aspirates the air from the tube 9 through the second filter 38B. The tube 5 and the suction mechanism 79*c* are connected upstream of the second filter 38B. In other words, a tube path extending from the tube 5 and the suction mechanism 79*c* is connected to the tube 9 upstream of the second filter 38B.

The second filter 38B gathers matter contained in the air current aspirated by the third dust-gathering blower 35, the air current flowing in the tube 5, and the air current aspirated by the suction mechanism 79*c*. The component which passes through the mesh belt 46 and the component which passes through the mesh belt 72 are gathered by the second filter 38B. The fourth dust-gathering blower 36 exhausts the air current which is aspirated through the second filter 38B to the second exhaust box 39B.

The second exhaust box 39B includes an exhaust port and exhausts the air which passes through the second filter 38B to the outside of the sheet manufacturing apparatus 100. The second exhaust box 39B may be provided with a sound-canceling structure which reduces the operation sounds and the like of the fourth dust-gathering blower 36 which are emitted from the exhaust port.

The molding section 80 is provided with a pressurizing section 82 and a heating section 84. The pressurizing section 82 is provided with a pair of pressurizing rollers 85, 85 and pressurizes the second web W2 at a predetermined nipping pressure to adjust the thickness of the second web W2 and increase the density of the second web W2. The pressurized sheet SS1 is formed from the second web W2 due to the processing of the pressurizing section 82.

The heating section 84 is provided with a pair of heating rollers 86 and binds the fibers originating from the material MC using the resin contained in the additive material AD by applying heat to the pressurized sheet SS1. Accordingly, the heated sheet SS2 is formed from the pressurized sheet SS1. The heated sheet SS2 is a sheet-like intermediate product subjected to pressurization and heating by the molding section 80 in which the strength, elasticity, and density of the second web W2 are increased. The heated sheet SS2 is transported to the cutting section 90 by the transport section 88.

The cutting section 90 is provided with a cutter 91. The cutter 91 is driven by a cutter drive section 330 (described later) to perform a process of pinching and cutting the heated sheet SS2 and to manufacture the sheet S of a set size. The cutter 91 cuts the heated sheet SS2 in a direction intersecting a transport direction F, for example. The cutting section 90 may be provided with a second cutter which cuts the heated sheet SS2 in a direction parallel to the transport direction F.

The sheet S cut by the cutting section 90 is discharged to a discharge portion 96. The discharge portion 96 is provided with a tray or a stacker which stores the sheet S. The user is capable of taking out and using the sheet S stored in the discharge portion 96.

The sheet manufacturing apparatus 100 is not limited to the configuration in which the first web W1 is transported in steps of the rotating body 49 onward. For example, the first web W1 may be taken out from the sheet manufacturing apparatus 100 and stored. A mode may be adopted in which the first web W1 is sealed in a predetermined package and transporting and transaction are possible. In this case, in the sheet manufacturing apparatus 100, a configuration may be adopted in which the first web W1 which is stored is supplied to the rotating body 49 or the mixing section 50 and it is possible to manufacture the sheet S.

The operations of the sheet manufacturing apparatus 100 are controlled by a controller 110. The configuration and the function of the controller 110 will be described later.

The sheet manufacturing apparatus 100 is provided with a first temperature/humidity sensor 431, a second temperature/humidity sensor 432, a third temperature/humidity sensor 433, and a fourth temperature/humidity sensor 434. These sensors are sensors which detect at least one of temperature and humidity. Each sensor may be a combined sensor module provided with a temperature sensor configured using a thermocouple or a thermistor and a humidity sensor, or alternatively, each sensor may be a sensor unit.

The first temperature/humidity sensor 431 is a sensor which detects the temperature and the humidity of a space in which the sheet manufacturing section 101 is installed. For example, the first temperature/humidity sensor 431 is installed in the inner portion of the housing of the sheet manufacturing apparatus 100.

The second temperature/humidity sensor 432 detects the temperature and the humidity of the defibrated matter MB agitated by the drum section 41 in the sorting section 40. The second temperature/humidity sensor 432 is installed in the inner portion of the drum section 41, for example.

The third temperature/humidity sensor 433 detects the temperature and the humidity of the mixture MX agitated by the drum section 61 in the dispersing section 60. The third temperature/humidity sensor 433 is installed in the inner portion of the drum section 61, for example.

The fourth temperature/humidity sensor 434 detects the temperature and the humidity of the space in which the second web W2, the pressurized sheet SS1, the heated sheet SS2, or the sheet S is transported in the molding section 80 or the transport section 88. The fourth temperature/humidity sensor 434 is installed in a first buffer portion 801 (described later), for example.

The sheet manufacturing apparatus 100 is provided with an ultrasonic wave sensor 441. The ultrasonic wave sensor 441 is configured by a sensor module or provided with an oscillator, a radiating section which radiates ultrasonic waves, and a detection section which detects the reflected waves of the ultrasonic waves. Alternatively, the ultrasonic wave sensor 441 is configured by a sensor unit. The ultrasonic wave sensor 441 is installed in the inner portion of the drum section 61 and detects the amount of the mixture MX present in the inner portion of the drum section 61.

The sheet manufacturing apparatus 100 is provided with a first thickness sensor 451 and a second thickness sensor 452. The first thickness sensor 451 and the second thickness sensor 452 are sensors which detect the thickness of measurement target matter. For example, each of the sensors is configured as a detecting device provided with an abutting member which abuts against the measurement target matter and a position detection section which detects the position of the abutting member. The position detection section is capable of using a linear encoder, a laser distance measurement device, or the like. The first thickness sensor 451 is installed in the inner portion of the supply section 10 and detects a thickness using the feedstock MA stored in the supply section 10 as the measurement target matter. The second thickness sensor 452 is installed in the transport path of the second web W2 and is installed between the dispersing section 60 and the second mist moisture adjusting section 78 in the example of FIG. 2. The second thickness sensor 452 detects the thickness using the second web W2 as the measurement target matter. The first thickness sensor 451 and the second thickness sensor 452 correspond to a thickness measuring section.

The sheet manufacturing apparatus 100 is provided with a first differential pressure sensor 461 and a second differential pressure sensor 462. The first differential pressure sensor 461 and the second differential pressure sensor 462 detect a difference in the pressure, that is, a pressure difference between two spaces partitioned by a partitioning wall. The first differential pressure sensor 461 is disposed in the first filter 38A and detects the pressure difference between the suction side and the exhaust side of the first filter 38A. The second differential pressure sensor 462 is disposed in the second filter 38B and detects the pressure difference between the suction side and the exhaust side of the second filter 38B.

1-4. Configuration of Pressurizing Section and Heating Section

Figure 3:
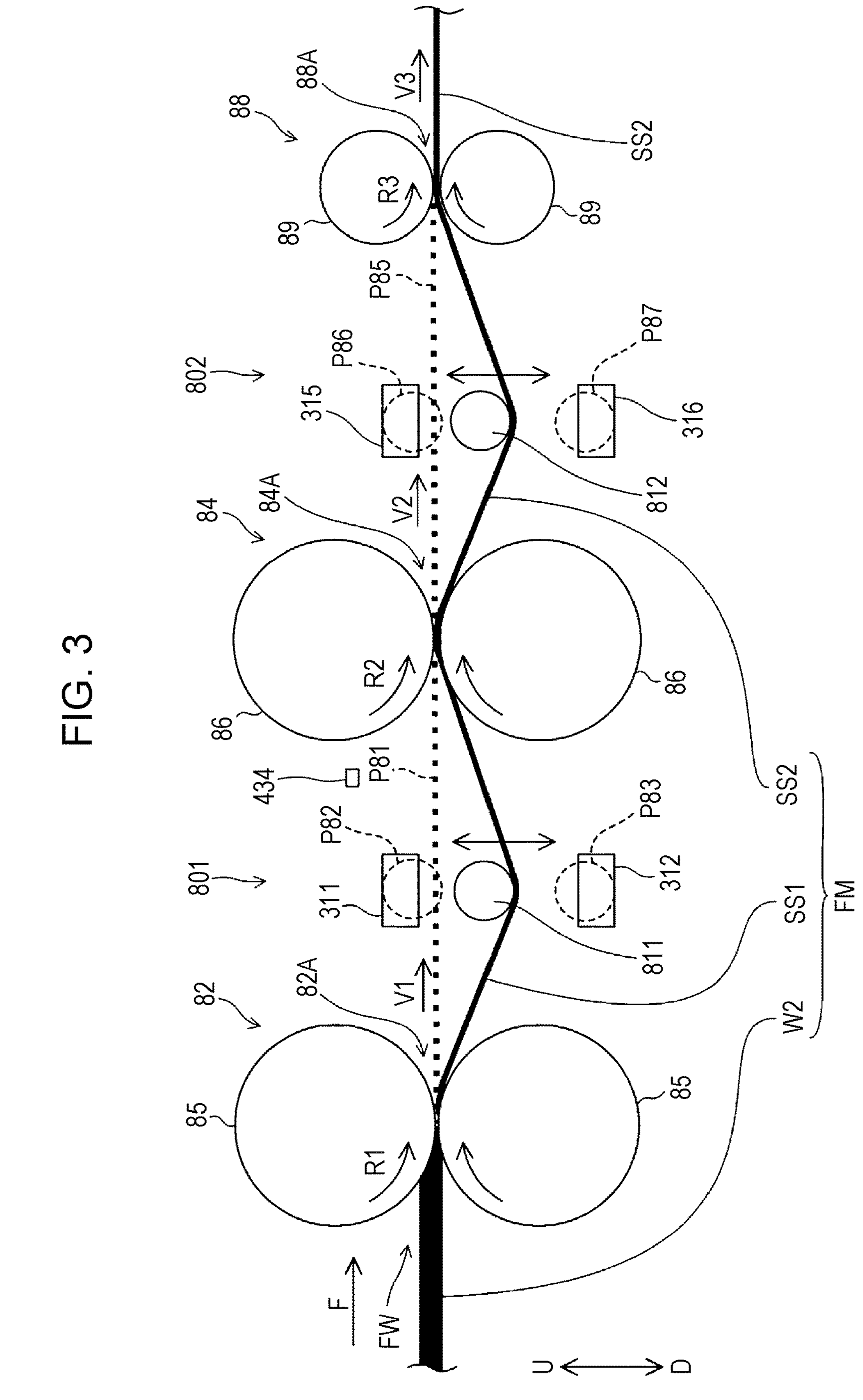
FIG. 3 is a view illustrating a configuration of a pressurizing section, a heating section, and a transport section configuring a transport section.

FIG. 3 is a view illustrating a configuration of the pressurizing section 82, the heating section 84, and the transport section 88 configuring the transport section. The transport section transports the second web W2, the pressurized sheet SS1, and the heated sheet SS2. The second web W2, the pressurized sheet SS1, and the heated sheet SS2 will be collectively referred to as transport target matter FM. The transport target matter FM corresponds to processing target matter. The path along which the transport target matter FM is transported is a transport path FW.

In FIG. 3, the transport direction of the material in the process of the sheet S being manufactured from the second web W2 is indicated by the symbol F, and in the present embodiment, the transport direction F is horizontal, for example. FIG. 3 indicates the up and down directions with respect to the transport direction F using arrows U and D. The arrow U faces upward and the arrow D faces downward.

The pressurizing section 82 includes the pair of pressurizing rollers 85 facing each other to interpose the transport path FW. The two pressurizing rollers 85 are pressurized in directions approaching each other by the motive force of a hydraulic drive section 331 (described later). According to the pressure, the second web W2 is pressurized by a nipping portion 82A of the pressurizing rollers 85 to increase in density and form the pressurized sheet SS1.

One of the pair of pressurizing rollers 85 is a drive roller driven by a pressurizing roller drive section 341 (described later) and the rotation speed of the pressurizing rollers 85 is controlled by the controller 110. Alternatively, both of the pair of pressurizing rollers 85 may be drive rollers. The pair of pressurizing rollers 85 rotate in a direction indicated by arrows in each of the drawings and transports the pressurized sheet SS1 toward the heating section 84.

In the following explanation, the rotation speeds of the pressurizing rollers 85 will be referred to as a rotation speed R1. The rotation speeds of the pressurizing roller 85 of the U side of the transport path FW and the pressurizing roller 85 of the D side are substantially the same. The speed at which the second web W2 and the pressurized sheet SS1 are transported by the rotation of the pressurizing rollers 85 is a transport speed V1.

The heating section 84 includes the pair of heating rollers 86 facing each other to interpose the transport path FW. The two heating rollers 86 are both heated to a temperature set by a roller heating section 332 (described later). The roller heating section 332 is provided with a heater which heats the heating rollers 86, for example. Examples of specific modes of the heater configuring the roller heating section 332 include heaters in contact with the outer circumferential surface of the heating rollers 86 and heaters disposed in the inner portions of the heating rollers 86. For these heaters, it is possible to use a resistor heater containing a ceramic heater, a heat ray radiating heater, a heater which heats the heating rollers 86 using microwaves, or the like. The heating rollers 86 may be configured such that heat-generating bodies are embedded therein.

The heating section 84 interposes the pressurized sheet SS1 using the pair of heating rollers 86 and heats the pressurized sheet SS1. Since the pressurized sheet SS1 is heated by the heating rollers 86 to a temperature higher than the glass transition point temperature of the bonding agent contained in the additive material AD, the fibers contained in the mixture MX are bonded together by the bonding agent to form the heated sheet SS2. In the heated sheet SS2, since the fibers are bonded by the bonding agent, the overall elasticity and hardness of the heated sheet SS2 are high as compared to the second web W2 and the pressurized sheet SS1. The heated sheet SS2 has a degree of strength at which it is possible to maintain a sheet shape.

One of the heating rollers 86 is a drive roller driven by a heating roller drive section 342 (described later). Alternatively, both of the heating rollers 86 may be drive rollers. The rotation speed of the heating rollers 86 is controlled by the controller 110. Each roller in the pair of heating rollers 86 rotates in a direction indicated by an arrow in the drawings and transports the heated sheet SS2 toward the cutting section 90. In the following explanation, the rotation speed of the heating rollers 86 will be referred to as a rotation speed R2. The rotation speeds of the heating roller 86 of the U side of the transport path FW and the heating roller 86 of the D side are substantially the same. The speed at which the pressurized sheet SS1 and the heated sheet SS2 are transported by the rotation of the heating rollers 86 is a transport speed V2.

The transport section 88 is disposed between the heating section 84 and the cutting section 90, that is, downstream of the heating section 84 in the transport direction F. The transport section 88 is provided with a pair of transport rollers 89 and interposes the heated sheet SS2 with the transport rollers 89 to transport the heated sheet SS2 toward the cutting section 90. The transport rollers 89 are drive rollers driven by a transport roller drive section 343 (described later). The rotation speed of the transport rollers 89 is controlled by the controller 110. In the transport section 88, a configuration may be adopted in which one of the transport rollers 89 is a drive roller and one of the transport rollers 89 is a follower roller, and a configuration may be adopted in which the two transport rollers 89 are drive rollers.

The pair of transport rollers 89 are disposed facing each other to interpose the transport path FW. The rotation speed of the transport rollers 89 is controlled by the controller 110. Each roller in the pair of transport rollers 89 rotates in a direction indicated by an arrow in the drawings and transports the heated sheet SS2 toward the cutting section 90. In the following explanation, the rotation speed of the transport rollers 89 will be referred to as a rotation speed R3. The rotation speeds of the transport roller 89 of the U side of the transport path FW and the transport roller 89 of the D side are considered to be substantially the same. The speed at which the heated sheet SS2 is transported by the rotation of the transport rollers 89 is a transport speed V3.

1-5. Configuration of Buffer Portions

In the transport path FW, the space between the pressurizing section 82 and the heating section 84 is the first buffer portion 801. In further detail, the first buffer portion 801 is the space between the nipping portion 82A and a nipping portion 84A. A first tension roller 811 in contact with the pressurized sheet SS1 from the U side is disposed in the first buffer portion 801. An external force toward the D direction is applied to the first tension roller 811 and the first tension roller 811 pushes the pressurized sheet SS1 in the D direction according to the external force.

In the first buffer portion 801, when the transport speed V2 is a lower speed than the transport speed V1, the length of the pressurized sheet SS1 in the first buffer portion 801 is longer than a minimum distance between the nipping portion 82A and the nipping portion 84A and slack is generated in the pressurized sheet SS1. In other words, there is an excess of the pressurized sheet SS1 by the amount by which the pressurized sheet SS1 is longer than the minimum distance between the nipping portion 82A and the nipping portion 84A. The first tension roller 811 pushes the pressurized sheet SS1 to the D side. Since the pressurized sheet SS1 is pushed by the first tension roller 811 and moves to the D side by the amount of excess length, a tension is applied to the pressurized sheet SS1 and the slack is suppressed.

The first tension roller 811 moves in the U-D directions according to the excess amount of the pressurized sheet SS1. In detail, when the excess amount is great, the first tension roller 811 moves in the D direction, and when the excess amount is little, the first tension roller 811 moves in the U direction.

In the transport path FW, the space between the heating section 84 and the transport section 88 is a second buffer portion 802. In further detail, the second buffer portion 802 is the space between the nipping portion 84A and a nipping portion 88A. A second tension roller 812 in contact with the heated sheet SS2 from the U side is disposed in the second buffer portion 802. An external force toward the D direction is applied to the second tension roller 812 and the second tension roller 812 pushes the heated sheet SS2 in the D direction according to the external force.

In the second buffer portion 802, when the transport speed V2 is a lower speed than the transport speed V3, the length of the heated sheet SS2 in the second buffer portion 802 is longer than a minimum distance between the nipping portion 84A and the nipping portion 88A and slack is generated in the heated sheet SS2. In other words, there is an excess of the heated sheet SS2 by the amount by which the heated sheet SS2 is longer than the minimum distance between the nipping portion 84A and the nipping portion 88A. The second tension roller 812 pushes the heated sheet SS2 to the D side. Since the heated sheet SS2 is pushed by the second tension roller 812 and moves to the D side by the amount of excess length, a tension is applied to the heated sheet SS2 and the slack is suppressed.

The second tension roller 812 moves in the U-D directions according to the excess amount of the heated sheet SS2. In detail, when the excess amount is great, the second tension roller 812 moves in the D direction, and when the excess amount is little, the second tension roller 812 moves in the U direction.

The first buffer portion 801 and the second buffer portion 802 have a function of stabilizing the transporting of the transport target matter FM. When the transport speed V2 is a higher speed than the transport speed V1, there is a possibility that excessive tension is applied to the pressurized sheet SS1. Therefore, the controller 110 controls the rotation of the pressurizing rollers 85 and the heating rollers 86 such that the transport speed V2 is less than or equal to the transport speed V1. As a result of this control, when there is an excess of the pressurized sheet SS1 in the first buffer portion 801 due to a speed difference between the transport speed V2 and the transport speed V1, the first tension roller 811 moves according to the excess amount of the pressurized sheet SS1 and the slack in the pressurized sheet SS1 is suppressed.

Similarly, the controller 110 performs control such that the transport speed V3 is a speed less than or equal to the transport speed V2. As a result of this control, when there is an excess of the heated sheet SS2 in the second buffer portion 802 due to a speed difference between the transport speed V3 and the transport speed V2, the second tension roller 812 moves according to the excess amount of the heated sheet SS2 and the slack in the heated sheet SS2 is suppressed.

Accordingly, it is possible to transport the transport target matter FM such that slack in the transport target matter FM and excessive tension in the transport target matter FM are not generated in the first buffer portion 801 and the second buffer portion 802.

FIG. 3 depicts a position P81 of the pressurized sheet SS1 when the excess amount of the pressurized sheet SS1 is at a minimum in the first buffer portion 801 using a dashed line. The position P81 is the transport path FW when the pressurized sheet SS1 is shortest in the first buffer portion 801. A position P82 of the first tension roller 811 when the excess amount of the pressurized sheet SS1 is small is depicted using a dashed line and a position P83 of the first tension roller 811 when the excess amount of the pressurized sheet SS1 is great is depicted using a dashed line. Although the position P82 may be the position of the first tension roller 811 when the pressurized sheet SS1 is shortest, it is preferable that the position P82 be a position shifted to be closer to the D side than the position of the first tension roller 811 when the pressurized sheet SS1 is shortest.

A first top sensor 311 and a first bottom sensor 312 which detect the pressurized sheet SS1 are disposed in the first buffer portion 801.

Although the first top sensor 311 and the first bottom sensor 312 may be sensors which directly detect the pressurized sheet SS1, in the present embodiment, the first top sensor 311 and the first bottom sensor 312 indirectly detect the pressurized sheet SS1 by detecting the first tension roller 811.

The first top sensor 311 may be a transmitting or a reflecting light sensor, for example. For example, when the first tension roller 811 is a permanent magnetic body or a strong magnetic body such as a metal, the first top sensor 311 may be a magnetic sensor. The same applies to the first bottom sensor 312.

The first top sensor 311 is disposed on the U side and the first bottom sensor 312 is disposed on the D side in a movement range of the first tension roller 811. The first top sensor 311 detects the first tension roller 811 at the position P82 and the first bottom sensor 312 detects the first tension roller 811 at the position P83. In other words, the first top sensor 311 and the first bottom sensor 312 are disposed in the transport path FW in the U-D directions intersecting the transport path FW. The first top sensor 311 and the first bottom sensor 312 are disposed to face each other in the U-D directions.

Using the first top sensor 311 and the first bottom sensor 312, it is possible to detect that the first tension roller 811 reaches the position P82 or the position P83 when the first tension roller 811 is displaced in the U-D directions corresponding to the excess amount of the pressurized sheet SS1.

FIG. 3 depicts a position P85 of the heated sheet SS2 when an excess amount of the heated sheet SS2 is smallest in the second buffer portion 802 using a dashed line. The position P85 is the transport path FW when the heated sheet SS2 is shortest in the second buffer portion 802. A position P86 of the second tension roller 812 when the excess amount of the heated sheet SS2 is smallest is depicted using a dashed line and a position P87 of the second tension roller 812 when the excess amount of the heated sheet SS2 is great is depicted using a dashed line. Although the position P86 may be the position of the second tension roller 812 when the heated sheet SS2 is shortest, it is preferable that the position P86 be a position shifted to be closer to the D side than the position of the second tension roller 812 when the heated sheet SS2 is shortest.

A second top sensor 315 and a second bottom sensor 316 which detect the heated sheet SS2 are disposed in the second buffer portion 802.

Although the second top sensor 315 and the second bottom sensor 316 may be sensors which directly detect the heated sheet SS2, in the present embodiment, the second top sensor 315 and the second bottom sensor 316 indirectly detect the heated sheet SS2 by detecting the second tension roller 812.

The second top sensor 315 may be a transmitting or a reflecting light sensor, for example. For example, when the second tension roller 812 is a permanent magnetic body or a strong magnetic body such as a metal, the second top sensor 315 may be a magnetic sensor. The same applies to the second bottom sensor 316.

The second top sensor 315 is disposed on the U side and the second bottom sensor 316 is disposed on the D side in a movement range of the second tension roller 812. The second top sensor 315 detects the second tension roller 812 at the position P86 and the second bottom sensor 316 detects the second tension roller 812 at the position P87. In other words, the second top sensor 315 and the second bottom sensor 316 are disposed in the transport path FW in the U-D directions intersecting the transport path FW. The second top sensor 315 and the second bottom sensor 316 are disposed to face each other in the U-D directions.

Using the second top sensor 315 and the second bottom sensor 316, it is possible to detect that the second tension roller 812 reaches the position P86 or the position P87 when the second tension roller 812 is displaced in the U-D directions corresponding to the excess amount of the heated sheet SS2.

As described later, the controller 110 acquires detection values of the first top sensor 311 and the first bottom sensor 312 and determines the position of the pressurized sheet SS1 in the first buffer portion 801. The controller 110 controls the rotation speed R2 of the heating rollers 86 based on the determination result. Similarly, the controller 110 acquires detection values of the second top sensor 315 and the second bottom sensor 316 and determines the position of the heated sheet SS2 in the second buffer portion 802. The controller 110 controls the rotation speed R3 of the transport section 88 based on the determination result. Accordingly, the sheet manufacturing apparatus 100 is capable of transporting the transport target matter FM in the first buffer portion 801 and the second buffer portion 802 in a stable state.

As illustrated in FIG. 3, the fourth temperature/humidity sensor 434 is disposed in the first buffer portion 801. The fourth temperature/humidity sensor 434 may be provided in the second buffer portion 802 and sensors similar to the fourth temperature/humidity sensor 434 may be provided in both the first buffer portion 801 and the second buffer portion 802. The fourth temperature/humidity sensor 434 detects the temperature and/or the humidity to which the transport target matter FM is exposed in the first buffer portion 801 and/or the second buffer portion 802.

1-6. Configuration of Control System of Sheet Manufacturing Apparatus

Figure 4:
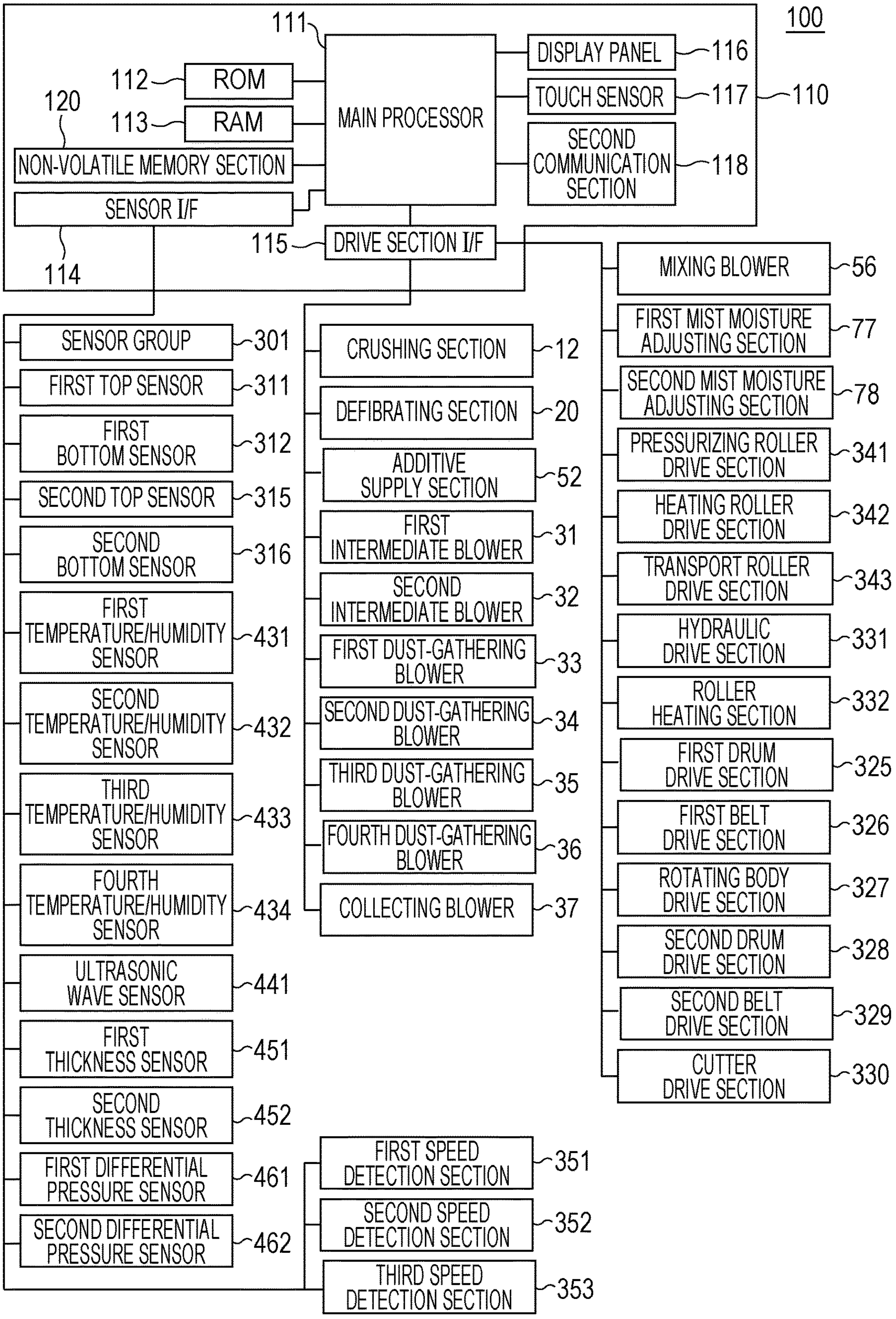
FIG. 4 is an explanatory diagram of a control system of the sheet manufacturing apparatus.

FIG. 4 is a block diagram illustrating the configuration of the control system of the sheet manufacturing apparatus 100.

The sheet manufacturing apparatus 100 is provided with the controller 110 including a main processor 111 controlling the parts of the sheet manufacturing apparatus 100.

The controller 110 is a computer provided with the main processor 111, a read only memory (ROM) 112, and a random access memory (RAM) 113. The main processor 111 is an operation processing device such as a central processing unit (CPU) and controls the parts of the sheet manufacturing apparatus 100 by executing a basic control program stored by the ROM 112. The main processor 111 may be configured as a system chip containing peripheral circuits such as the ROM 112 and the RAM 113 and other IP cores.

The ROM 112 stores, in a non-volatile manner, a program to be executed by the main processor 111. The RAM 113 forms a working area used by the main processor 111 and temporarily stores a program to be executed by the main processor 111, processing target data, or the like.

The controller 110 is provided with a non-volatile memory section 120. The non-volatile memory section 120 stores a program to be executed by the main processor 111 and data to be processed by the main processor 111.

The controller 110 is provided with a sensor interface 114, a drive section interface 115, a display panel 116, a touch sensor 117, and the second communication section 118. In the following descriptions and drawings, the interface will be abbreviated to I/F.

The display panel 116 is a panel for displaying such as a liquid crystal display and is installed in the exterior packaging of the sheet manufacturing apparatus 100, for example. The display panel 116 displays the operational state, various setting values, warning displays, and the like of the sheet manufacturing apparatus 100 according to the control of the main processor 111.

The touch sensor 117 detects a touch manipulation or a push manipulation by a user. The touch sensor 117 is disposed to overlap the display surface of the display panel 116, for example, and detects manipulation of the display panel 116. The touch sensor 117 outputs, to the main processor 111, manipulation data containing a manipulation position, a number of manipulation positions, and the like corresponding to manipulation. The main processor 111 detects manipulation of the display panel 116 according to the output of the touch sensor 117 and acquires the manipulation position. The main processor 111 realizes graphical user interface (GUI) manipulation based on the manipulation position detected by the touch sensor 117 and display data 122 being displayed on the display panel 116.

The controller 110 connects to various sensors provided in the sheet manufacturing apparatus 100 via the sensor I/F 114.

The sensor I/F 114 is an interface which acquires detection values output by the sensors and inputs the detection values to the main processor 111. The sensor I/F 114 may be provided with an analog/digital (A/D) converter which converts analog signals output by the sensors to digital data. The sensor I/F 114 may supply a drive current to the sensors. The sensor I/F 114 may be provided with a circuit which acquires the output values of each of the sensors according to a sampling frequency specified by the main processor 111 and outputs the output values to the main processor 111.

The sensors connected to the sensor I/F 114 are sensors detecting the operational states of parts such as the supply section 10, the crushing section 12 the defibrating section 20, the sorting section 40, the first web forming section 45, the mixing section 50, the dispersing section 60, the second web forming section 70, and the web moving section 79. For example, the sensors may be a sensor detecting the amount of the feedstock MA in the supply section 10, a sensor or the like detecting the remaining amount of the additive material AD in the additive supply section 52, and a sensor detecting the material to be used by the sheet manufacturing apparatus 100 in the manufacturing of the sheet S. The various sensors are collectively referred to as a sensor group 301.

The first top sensor 311, the first bottom sensor 312, the second top sensor 315, and the second bottom sensor 316 are connected to the sensor I/F 114. The first temperature/humidity sensor 431, the second temperature/humidity sensor 432, the third temperature/humidity sensor 433, and the fourth temperature/humidity sensor 434 are connected to the sensor I/F 114.

The ultrasonic wave sensor 441, the first thickness sensor 451, the second thickness sensor 452, the first differential pressure sensor 461, and the second differential pressure sensor 462 are connected to the sensor I/F 114.

The sensor I/F 114 acquires, as a sampling frequency set for each of the sensors, the detection values of each of the sensors connected to the sensor I/F 114 according to the control of the controller 110. The sensor I/F 114 outputs the data indicating the detection values of the sensors to the controller 110.

A first speed detection section 351, a second speed detection section 352, and a third speed detection section 353 are connected to the sensor I/F 114. The first speed detection section 351 is a detection section which detects the rotation speed of the pressurizing rollers 85. Specifically, an encoder provided in the pressurizing rollers 85, a rotation sensor using magnetism, or the like may be used. Alternatively, the motor which causes the pressurizing rollers 85 to rotate or the drive circuit which drives the motor may also function as the first speed detection section 351 by detecting the rotation speed of the pressurizing rollers 85.

The second speed detection section 352 detects the rotation speed of the heating rollers 86. The third speed detection section 353 detects the rotation speed of the transport rollers 89. It is possible to configure the second speed detection section 352 and the third speed detection section 353 in the same manner as the first speed detection section 351. The detection values of the first speed detection section 351, the second speed detection section 352, and the third speed detection section 353 are acquired by the controller 110 via the sensor I/F 114.

The controller 110 is connected to each of the drive sections provided in the sheet manufacturing apparatus 100 via a drive section I/F 115. The drive sections provided in the sheet manufacturing apparatus 100 are motors, pumps, heaters, and the like. Besides a configuration in which the drive section I/F 115 is directly connected to the motors, the drive section I/F 115 may be connected to drive circuits or drive integrated circuits (IC) which supply the drive currents to the motors according to the control of the controller 110.

The crushing section 12, the defibrating section 20, and the additive supply section 52 are connected to the drive section I/F 115 as control targets of the controller 110. The control target of the controller 110 in the crushing section 12 is a motor (not illustrated) or the like which operates the crushing blade 14. The control target of the controller 110 in the defibrating section 20 is a motor (not illustrated) or the like which causes the rotor 24 to rotate. The control targets in the additive supply section 52 are an actuator, motor, and the like (not illustrated) which drive the feeder of the additive dispensing section 52*b* and the shutter of the additive feeding section 52*c*.

The first intermediate blower 31, the second intermediate blower 32, the first dust-gathering blower 33, the second dust-gathering blower 34, the third dust-gathering blower 35, and the fourth dust-gathering blower 36 are connected to the drive section I/F 115. The collecting blower 37 and the mixing blower 56 are connected to the drive section I/F 115. Each of the fan motors provided in the blowers or the control circuits which control the fan motors is connected to the drive section I/F 115.

The first mist moisture adjusting section 77 and the second mist moisture adjusting section 78 are connected to the drive section I/F 115. In detail, each of the ultrasonic wave oscillation generating device, pump, or the like provided in the first mist moisture adjusting section 77 and the second mist moisture adjusting section 78 or the control circuits controlling the ultrasonic wave oscillation generating device, pump, or the like is connected to the drive section I/F 115.

The first drum drive section 325 is a motor or the like which causes the drum section 41 to rotate. The first belt drive section 326 is a motor or the like which operates the mesh belt 46. The rotating body drive section 327 is a motor or the like which causes the rotating body 49 to rotate. The second drum drive section 328 is a motor or the like which causes the drum section 61 to rotate. The second belt drive section 329 is a motor or the like which operates the mesh belt 72. The cutter drive section 330 is a motor, an actuator, or the like which drives the cutter 91.

The hydraulic drive section 331, the roller heating section 332, the pressurizing roller drive section 341, the heating roller drive section 342, and the transport roller drive section 343 are connected to the drive section I/F 115.

The hydraulic drive section 331 is a drive section having a hydraulic mechanism (not illustrated) provided in the pressurizing section 82 and applies pressure to the pressurizing rollers 85 to apply a predetermined nipping pressure to the nipping portion 82A.

The roller heating section 332 is a heater (not illustrated) provided in the heating section 84 and heats the heating rollers 86.

The pressurizing roller drive section 341 contains a motor which causes the pressurizing rollers 85 to rotate. The pressurizing roller drive section 341 operates according to the control of the controller 110 to cause the pressurizing rollers 85 to rotate. The controller 110 is capable of increasing and decreasing the speed of the rotation speed R1 of the pressurizing rollers 85 by controlling the pressurizing roller drive section 341.

The heating roller drive section 342 contains a motor which causes the heating rollers 86 to rotate. The heating roller drive section 342 operates according to the control of the controller 110 to cause the heating rollers 86 to rotate. The controller 110 is capable of increasing and decreasing the speed of the rotation speed R2 of the heating rollers 86 by controlling the heating roller drive section 342.

The transport roller drive section 343 contains a motor which causes the transport rollers 89 to rotate. The transport roller drive section 343 operates according to the control of the controller 110 to cause the transport rollers 89 to rotate. The controller 110 is capable of increasing and decreasing the speed of the rotation speed R3 of the transport rollers 89 by controlling the transport roller drive section 343.

1-7. Configuration of Controller

Figure 5:
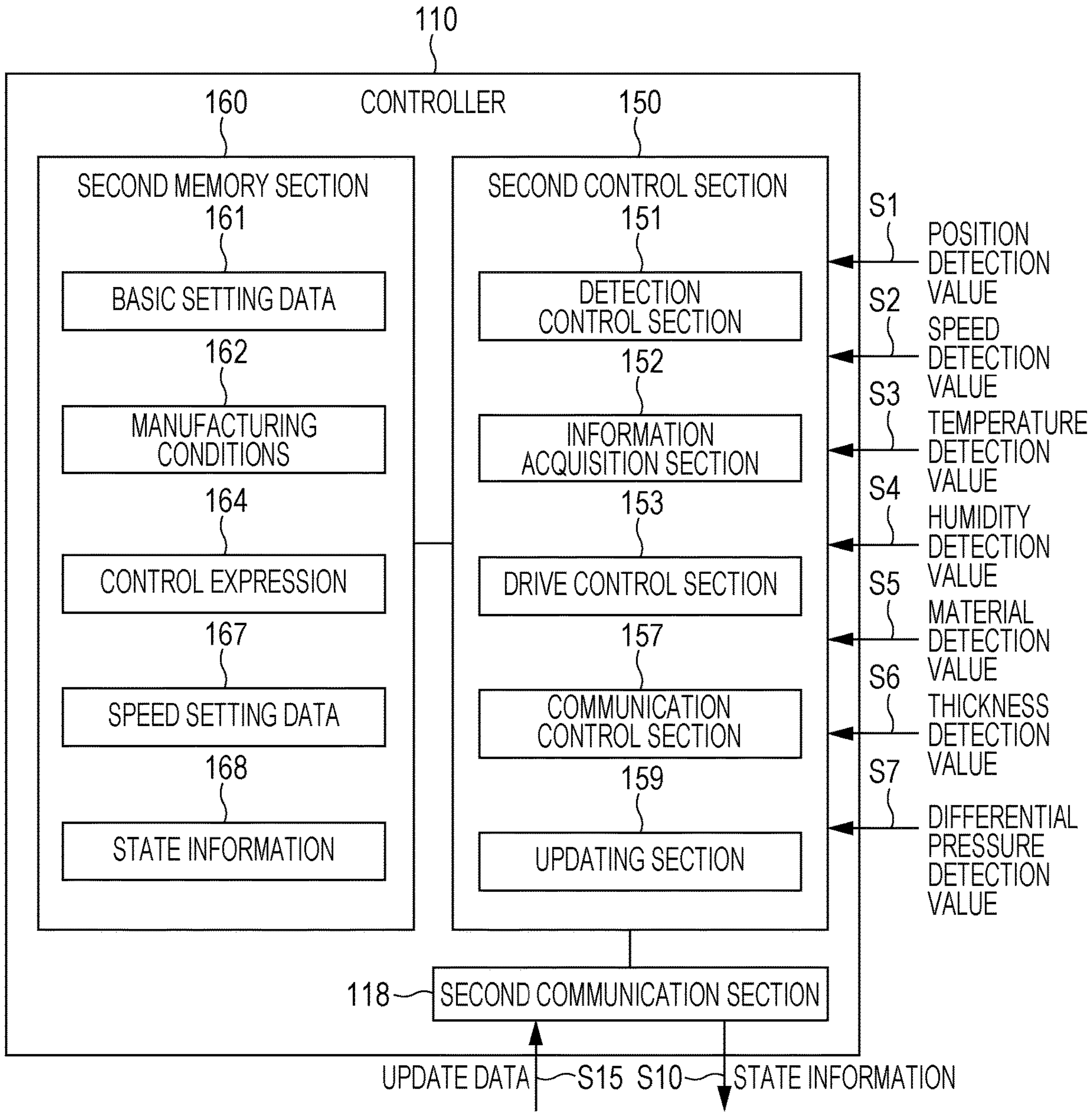
FIG. 5 is a functional block diagram of a controller of a first embodiment.

FIG. 5 is a functional block diagram of the controller 110.

The controller 110 realizes various functional sections using cooperation between software and hardware by executing a program using the main processor 111. FIG. 5 illustrates the function of the main processor 111 including the functional sections as the second control section 150. The controller 110 uses a memory region of the non-volatile memory section 120 to configure a second memory section 160 which is a logical memory device. Here, the second memory section 160 may be configured using memory regions of the ROM 112 and the RAM 113.

The second control section 150 is provided with a detection control section 151, an information acquisition section 152, a drive control section 153, a communication control section 157, and an updating section 159. These sections are realized by executing a program using the main processor 111. The controller 110 may execute an operating system configuring a platform of an application program as a basic control program for controlling the sheet manufacturing apparatus 100. In this case, the functional sections of the second control section 150 may be implemented as application programs.

The second memory section 160 stores various data to be processed by the second control section 150. For example, the second memory section 160 stores basic setting data 161, manufacturing conditions 162, a control expression 164, speed setting data 167, and state information 168.

The basic setting data 161 is generated according to manipulation of the touch sensor 117 or based on commands and data input via a communication interface (not illustrated) provided in the controller 110 and the basic setting data 161 is stored in the second memory section 160.

The basic setting data 161 contains setting values and the like relating to the operations of the sheet manufacturing apparatus 100. For example, the basic setting data 161 contains the initial values and the like of the type of the feedstock MA to be used in the sheet manufacturing apparatus 100, the control target values of the first mist moisture adjusting section 77 and the second mist moisture adjusting section 78, and the control target values of each of the other drive sections.

The manufacturing conditions 162 contains data relating to the manufacturing conditions of the sheet S. The manufacturing conditions 162 contains, for each kind of the sheet S to be manufactured, the type of the additive material AD, the amount of the additive material AD, the consumption amount of the feedstock MA, and the like to be used by the sheet manufacturing apparatus 100. When the sheet manufacturing apparatus 100 manufactures the sheet S, the number and kind of the sheet S to be manufactured is specified by setting in advance or by the manipulation of an operator detected by the touch sensor 117. The manufacturing conditions 162 may contain data indicating the specified number and kind of the sheets S to be manufactured.

The control expression 164 is information to calculate the parameters for the drive control section 153 to drive the sheet manufacturing section 101 and is an operational expression, a table, an algorithm, or the like which calculates a value. The control expression 164 of the present embodiment is a control expression for obtaining a parameter relating to the control of the rotation speed R1 of the pressurizing rollers 85, the rotation speed R2 of the heating rollers 86, and the rotation speed R3 of the transport section 88. The drive control section 153 functions as a rotation control section and controls the pressurizing roller drive section 341, the heating roller drive section 342, and the transport roller drive section 343 based on the control value output by the control expression 164.

The speed setting data 167 contains data for the second control section 150 to control the speeds of the pressurizing roller drive section 341, the heating roller drive section 342, and the transport roller drive section 343. The speed setting data 167 contains parameters for the second control section 150 to adjust, in a stepwise manner, the speeds of the pressurizing roller drive section 341, the heating roller drive section 342, and the transport roller drive section 343.

FIG. 6 is a schematic diagram illustrating a configuration example of the speed setting data 167.

In the example illustrated in FIG. 6, the setting values of the rotation speeds R1, R2, and R3 are contained in the speed setting data 167 in association with each other.

In the example of FIG. 6, "Vp" is contained as the setting value of the rotation speed R1. The speed setting data 167 contains two stages of speed "Vhs" and "Vhf" as setting values of the rotation speed R2 of the heating rollers 86, where Vhf>Vhs. The rotation speed R1 of the pressurizing rollers 85 is fixed at Vp. When the rotation speed R2 is the speed Vhs, transport speed V1>transport speed V2. When the rotation speed R2 is the speed Vhf, transport speed V1<transport speed V2.

For example, when the rotation speed R2 is set to the speed Vhs, the transport speed V2 is set to be a 5% lower speed than the transport speed V1. In other words, transport speed V2=transport speed V1×0.95. In the speed Vhf of the rotation speed R2, the transport speed V2 is set to be a 5% higher speed than the transport speed V1. In other words, transport speed V2=transport speed V1×1.05.

The speed setting data 167 contains four stages of speed "Vc1", "Vc2", "Vc3", and "Vc4" as the setting values of the rotation speed R3, where Vc1<Vc2<Vc3<Vc4. The speeds Vc1 and Vc2 correspond to a case in which the rotation speed R2 is the speed Vhs. The speeds Vc3 and Vc4 correspond to a case in which the rotation speed R2 is the speed Vhf.

When the rotation speed R2 is the speed Vhs and the rotation speed R3 is the speed Vc1, transport speed V2>transport speed V3.

When the rotation speed R2 is the speed Vhs and the rotation speed R3 is the speed Vc2, transport speed V2<transport speed V3.

For example, when the rotation speed R2 is the speed Vhs and the rotation speed R3 is the speed Vc1, the transport speed V3 is set to be a 5% lower speed than the transport speed V2. In other words, transport speed V3=transport speed V2×0.95. When the rotation speed R3 is the speed Vc2, the transport speed V3 is set to be a 5% higher speed than the transport speed V2. In other words, transport speed V3=transport speed V2×1.05.

When the rotation speed R2 is the speed Vhf and the rotation speed R3 is the speed Vc3, transport speed V2>transport speed V3.

When the rotation speed R2 is the speed Vhf and the rotation speed R3 is the speed Vc4, transport speed V2<transport speed V3.

For example, when the rotation speed R2 is the speed Vhf and the rotation speed R3 is the speed Vc3, the transport speed V3 is set to be a 5% lower speed than the transport speed V2. In other words, transport speed V3=transport speed V2×0.95. When the rotation speed R3 is the speed Vc4, the transport speed V3 is set to be a 5% higher speed than the transport speed V2. In other words, transport speed V3=transport speed V2×1.05.

The second control section 150 switches the rotation speed R2 and the rotation speed R3 in a stepwise manner by controlling the pressurizing roller drive section 341, the heating roller drive section 342, and the transport roller drive section 343 according to the speed setting data 167. Accordingly, it is possible to switch the magnitude relationship between the transport speeds V1, V2, and V3.

The detection control section 151 controls the detection by each of the sensors connected to the sensor I/F 114 and acquires the detection values of the sensors.

The information acquisition section 152 acquires the state information based on the detection values of each of the sensors acquired by the detection control section 151. The state information acquired by the information acquisition section 152 contains a position detection value S1, a speed detection value S2, a temperature detection value S3, a humidity detection value S4, a material detection value S5, a thickness detection value S6, and a differential pressure detection value S7.

The position detection value S1 contains the detection values of the first top sensor 311, the first bottom sensor 312, the second top sensor 315, and the second bottom sensor 316. The position detection value S1 may contain information obtained by processing the detection values of each of the sensors. For example, the position detection value S1 may contain information relating to the position of the first tension roller 811 and information relating to the position of the second tension roller 812.

The speed detection value S2 contains detection values of each of the first speed detection section 351, the second speed detection section 352, and the third speed detection section 353. The speed detection value S2 may contain information indicating the rotation speeds R1, R2, and R3 obtained from the detection values of each of the detection sections. Although the rotation speeds R1, R2, and R3 are controlled by the controller 110 based on target values, there is a case in which the rotation speeds R1, R2, and R3 deviate from the target valued due to the influence of individual differences in motors or the like. Since the speed detection value S2 is a value based on the detection values of the first speed detection section 351, the second speed detection section 352, and the third speed detection section 353, it is possible to use the speed detection value S2 as an indicator of the individual differences in the motors.

The temperature detection value S3 contains information relating to each of the detection values of the first temperature/humidity sensor 431, the second temperature/humidity sensor 432, the third temperature/humidity sensor 433, and the fourth temperature/humidity sensor 434, or alternatively, information relating to the temperatures obtained from the detection values. The humidity detection value S4 contains information relating to each of the detection values of the first temperature/humidity sensor 431, the second temperature/humidity sensor 432, the third temperature/humidity sensor 433, and the fourth temperature/humidity sensor 434, or alternatively, information relating to the humidity obtained from the detection values.

It is possible to use the temperature detection value S3 and the humidity detection value S4 as indicators of the water content of the material configuring the second web W2. Here, the material corresponds to the defibrated matter MB, the material MC, the mixture MX, or the like. The water content of the material influences the inter-fiber bonding force in the steps before the molding section 80. A deficiency in the water content of the material is a factor weakening the inter-fiber bonding force in the fibers contained in the material. Therefore, the temperature detection value S3 and the humidity detection value S4 may be an indicator relating to the strength of the second web W2 or the ease of damaging the shape of the second web W2.

The material detection value S5 contains information relating to the detection value of the ultrasonic wave sensor 441 or the amount of the mixture MX obtained from the detection value.

It is possible to use the material detection value S5 as an indicator of the density of the mixture MX in the inner portion of the drum section 61. The density of the mixture MX influences the descending amount of the mixture MX which descends from the drum section 61 toward the mesh belt 72 in the dispersing section 60. The descending amount per unit time of the mixture MX which descends onto the mesh belt 72 influences the fluctuation in the thickness of the second web W2 and the occurrence of thickness irregularities in the second web W2. A deficiency in the thickness of the second web W2 and the occurrence of thickness irregularities are factors in reductions in the strength or variation in the strength of the second web W2. Therefore, the material detection value S5 may be an indicator relating to the strength of the second web W2 or the ease of damaging the shape of the second web W2.

The thickness detection value S6 contains information relating to each of the detection values of the first thickness sensor 451 and the second thickness sensor 452 or the thickness obtained from the detection values. For example, although the thickness detection value S6 contains information relating to the thickness of the feedstock MA and information relating to the thickness of the second web W2, the thickness detection value S6 may contain information relating to the thickness of only one of feedstock MA and the second web W2.

The detection values of the first thickness sensor 451 and the second thickness sensor 452 contained in the thickness detection value S6 may be an indicator relating to the strength of the second web W2 or the ease of damaging the shape of the second web W2. In other words, since the supply section 10 adjusts the supply amount of the feedstock MA in page number units, the thickness of the feedstock MA detected by the first thickness sensor 451 influences the amount of the feedstock MA to be supplied per unit time from the supply section 10. The fluctuation in the supply amount of the feedstock MA influences the fluctuation in the thickness of the second web W2 and the occurrence of thickness irregularities in the second web W2. The detection value of the second thickness sensor 452 is an indicator of the deficiency and the fluctuation in the thickness of the second web W2. Therefore, the thickness detection value S6 may be an indicator relating to the strength of the second web W2 or the ease of damaging the shape of the second web W2.

The differential pressure detection value S7 contains information relating to each of the detection values of the first differential pressure sensor 461 and the second differential pressure sensor 462 or the pressure difference obtained from the detection values. The detection value of the first differential pressure sensor 461 reflects the descending amount of the defibrated matter MB which descends from the drum section 41 to the first web forming section 45 in the sorting section 40. The detection value of the second differential pressure sensor 462 reflects the descending amount of the mixture MX which descends onto the mesh belt 72. Therefore, the differential pressure detection value S7 may be an indicator relating to the strength of the second web W2 or the ease of damaging the shape of the second web W2.

In this manner, the state information 168 acquired by the information acquisition section 152 is an indicator of the factors influencing the strength of the second web W2 and the ease of damaging the shape of the second web W2 in the process of the sheet S being manufactured by the sheet manufacturing section 101.

The information acquisition section 152 acquires the position detection value S1. The information acquisition section 152 may acquire all of the speed detection value S2, the temperature detection value S3, the temperature detection value S3, the humidity detection value S4, the material detection value S5, the thickness detection value S6, and the differential pressure detection value S7, and may acquire only a subset of the values.

The information acquisition section 152 stores the acquired information of the position detection value S1, the speed detection value S2, the temperature detection value S3, the humidity detection value S4, the material detection value S5, the thickness detection value S6, and the differential pressure detection value S7 in the second memory section 160 as the state information 168.

The state information 168 is the detection values of each of the sensors connected to the sensor I/F 114 and is the information acquired by the information acquisition section 152.

By controlling the parts of the sheet manufacturing section 101 based on the detection values acquired by the detection control section 151, the drive control section 153 operates the sections of the sheet manufacturing apparatus 100 according to the setting values of the basic setting data 161 and manufactures the sheet S.

For example, the drive control section 153 drives the crushing section 12, the defibrating section 20, the additive supply section 52, and the like according to the control target values contained in the basic setting data 161. The drive control section 153 controls the first intermediate blower 31, the second intermediate blower 32, the first dust-gathering blower 33, the second dust-gathering blower 34, the third dust-gathering blower 35, and the fourth dust-gathering blower 36, the collecting blower 37, and the mixing blower 56.

The drive control section 153 drives the first mist moisture adjusting section 77 and the second mist moisture adjusting section 78 according to the control target values contained in the basic setting data 161 and executes the moisture adjustment.

For example, the drive control section 153 controls by controlling the pressurizing roller drive section 341, the heating roller drive section 342, and the transport roller drive section 343 according to the speed setting data 167 and controls the rotation speeds R1, R2, and R3 in a stepwise manner.

The drive control section 153 executes a startup sequence when starting up the sheet manufacturing section 101 and executes a stopping sequence when stopping the sheet manufacturing section 101 to sequentially start up and stop the parts of the sheet manufacturing section 101.

The communication control section 157 controls the second communication section 118 to execute the communication with the control device 200. For example, the communication control section 157 reads out the state information 168 and transmits the state information 168 to the control device 200 as state information S10 using the second communication section 118. For example, the communication control section 157 receives update data S15 transmitted by the control device 200 using the second communication section 118.

The updating section 159 updates the control expression 164 according to the update data S15.

1-8. Configuration of Control Device

Figure 7:
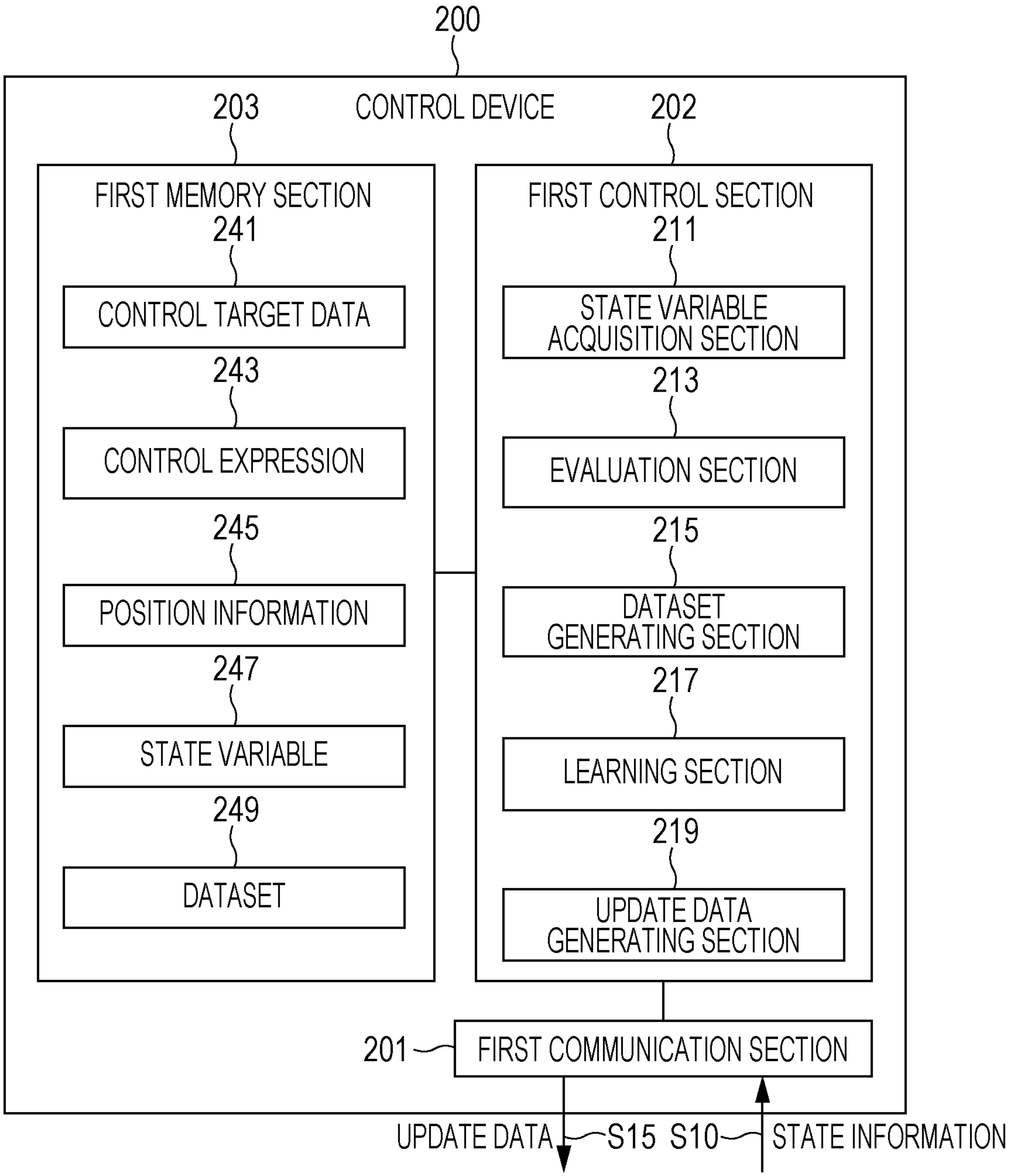
FIG. 7 is a functional block diagram of a control device.

FIG. 7 is a functional block diagram of the control device 200.

The control device 200 is provided with the first communication section 201, the first control section 202 which controls the control device 200, and a first memory section 203.

The control device 200 is provided with a processor (not illustrated) which is configured by an operation processing device such as a CPU. In the control device 200, a processor executes a program and the parts of the first control section 202 are realized through the cooperation between software and hardware.

The control device 200 is provided with the first memory section 203 which is configured by ROM, RAM, a nonvolatile memory device, or the like. The first memory section 203 is configured by a semiconductor element, a magnetic recording device, an optical recording device, or the like, for example. The first memory section 203 includes a memory region which stores data and programs.

The first control section 202 is provided with a state variable acquisition section 211, an evaluation section 213, a dataset generating section 215, a learning section 217, and an update data generating section 219.

The first memory section 203 stores control target data 241, a control expression 243, position information 245, a state variable 247, and a dataset 249.

The control target data 241 is information relating to the sheet manufacturing apparatus 100 which is connected to the control device 200 via the communication network N and serves as the target on which the control device 200 performs a process relating to the control expression. For example, the control target data 241 may contain a network address or the like used by the first communication section 201 on the communication network N to identify the sheet manufacturing apparatus 100 contained in the control system 1.

The control expression 243 is an expression used by the sheet manufacturing apparatus 100 in the control relating to the transporting of the transport target matter FM and corresponds to the control expression 164.

The state variable acquisition section 211 acquires the position information 245 and the state variable 247 based on the state information S10 received from the sheet manufacturing apparatus 100. The position information 245 and the state variable 247 are stored in the first memory section 203.

The state information S10 contains the detection values of each of the sensors acquired by the information acquisition section 152 of the sheet manufacturing apparatus 100 or contains information obtained from the detection values. The state variable acquisition section 211 may acquire the position information 245 and the state variable 247 by extracting the detection values contained in the state information S10 or information obtained from the detection values. The state variable acquisition section 211 may perform a predetermined operational process based on the information contained in the state information 810 to obtain the position information 245 and the state variable 247.

The position information 245 is information indicating the positions of the first tension roller 811 and the second tension roller 812. It is identified as to whether the position of the first tension roller 811 is the position P82, the position P83, or between the position P82 and the position P83 based on the detection values of the first top sensor 311 and the first bottom sensor 312. Similarly, it is identified as to whether the position of the second tension roller 812 is the position P86, the position P87, or between the position P86 and the position P87 based on the detection values of the second top sensor 315 and the second bottom sensor 316. The position information 245 is information identifying these positions.

The state variable 247 is information which may be obtained from one or more detection values of the speed detection value S2, the temperature detection value S3, the humidity detection value S4, the material detection value S5, the thickness detection value S6, and the differential pressure detection value S7 among the detection values contained in the state information S10. Furthermore, it is preferable that the state variable 247 contain information which may be obtained from at least any one of the temperature detection value s3, the humidity detection value S4, the material detection value S5, the thickness detection value S6, and the differential pressure detection value S7. As described above, the detection values are information relating to factors in the strength and ease of damaging the shape of the second web W2 and the external environment to which the second web W2 is exposed. The state variable 247 is obtained by extracting the information relating to these factors as data to be used in the learning of the learning section 217.

The evaluation section 213 evaluates the transporting state of the transport target matter FM in the first buffer portion 801 and the second buffer portion 802 based on the position information 245 acquired by the state variable acquisition section 211. For example, the evaluation section 213 performs positive/negative determination of whether or not the transporting state according to the tension placed upon the transport target matter FM in the first buffer portion 801 and the second buffer portion 802 is a favorable state. In this case, the evaluation result of the evaluation section 213 is either positive or negative. For example, the evaluation section 213 digitizes the evaluation of the transporting state of the transport target matter FM in the first buffer portion 801 and the second buffer portion 802. In this case, the evaluation result of the evaluation section 213 is a number evaluating the transporting state of the transport target matter FM. The transporting state is not limited to the tension placed upon the transport target matter FM, and for example, the transporting straightness of the transport target matter FM when the transport target matter FM is viewed in plan view and the like are included in the transporting state.

The dataset generating section 215 associates the state variable 247 with the evaluation result of the evaluation section 213 to generate the dataset 249. The dataset 249 is data for the learning section 217 to learn.

The dataset 249 contains data relating to the evaluation result of the evaluation section 213 and the state variable 247 received as the state information S10 together with the position information 245 evaluated by the evaluation section 213. In other words, data in which the state of the sheet manufacturing section 101 indicated by the state variable 247 and the evaluation result of the transporting state of the transport target matter FM in this state are associated with each other.

The learning section 217 performs machine learning using the dataset 249 and updates the control expression 243 to be used by the sheet manufacturing apparatus 100.

For example, is it possible for the control expression 243 and the control expression 164 to be a trained model which uses the information acquired by the information acquisition section 152 as input and outputs a parameter relating to the control of the rotation speeds R1, R2, and R3. In this case, for example, the learning section 217 executes so-called supervised learning, uses the evaluation result of the evaluation section 213 in the dataset 249 as labels, learns the data associated with the labels, and updates the control expression 243.

The specific mode of the learning to be executed by the learning section 217 is not particularly limited and the learning section 217 may extract the dataset in which the evaluation result of the evaluation section 213 corresponds to a specific evaluation result from the dataset 249 to execute so-called unsupervised learning. The learning section 217 may execute semi-supervised learning and may execute so-called transfer learning using a trained learning model. For example, the learning section 217 may execute a multiple linear regression model for a plurality of the state variables 247 contained in the dataset 249 and may further execute deep learning.

The learning section 217 updates the control expression 243 through learning which uses the dataset 249.

The update data generating section 219 generates the update data S15 for causing the sheet manufacturing apparatus 100 to execute the control expression 243 after the control expression 243 is updated by the learning section 217. The update data S15 is data for performing an update based on the result of the learning section 217 learning the control expression 164 stored by the sheet manufacturing apparatus 100. For example, the update data S15 contains the updated control expression 164.

The updating section 159 provided in the sheet manufacturing apparatus 100 updates the control expression 164 according to the update data S15 transmitted by the control device 200 as described above. Accordingly, the sheet manufacturing apparatus 100 is capable of controlling the rotation speeds R1, R2, and R3 based on the control expression 164 updated by the learning section 217 through learning.

1-9. Operations of Control System

Figure 8:
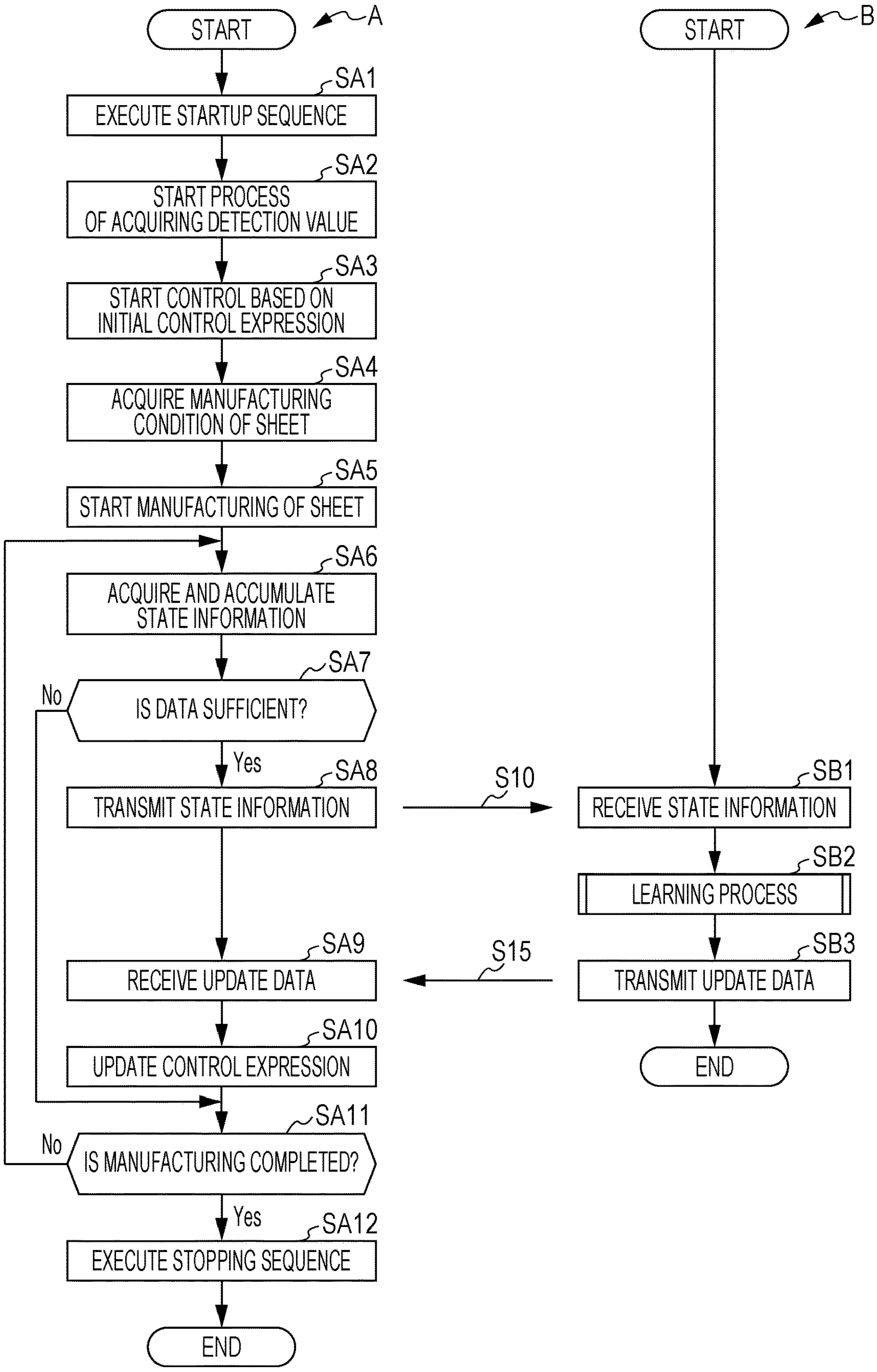
FIG. 8 is a sequence diagram illustrating the operations of the control system.

FIG. 8 is a diagram illustrating the operations of the control system 1. In FIG. 8, A is the operations of the sheet manufacturing apparatus 100 and B is the operations of the control device 200. FIG. 8 illustrates an outline of the overall operations of the control system 1 and details of the operations of the sheet manufacturing apparatus 100 will be described later.

The second control section 150 executes a startup sequence (step SA1). In step SA1, the second control section 150 initializes each of the sensors connected to the sensor I/F 114 and each of the drive sections connected to the drive section I/F 115 and causes the drive sections to start up in a set order.

The detection control section 151 starts a process of acquiring the detection values of each of the sensors (step SA2). Next, the drive control section 153 starts the control of each of the parts of the sheet manufacturing section 101 (step SA3). In step SA3, the drive control section 153 references the basic setting data 161 and starts the control based on the initial values of the sheet manufacturing section 101. For example, the drive control section 153 drives the pressurizing roller drive section 341, the heating roller drive section 342, and the transport roller drive section 343 based on the initial values of the speed setting data 167. The initial values of the speed setting data 167 are the values before being updated by the operations described later. The second memory section 160 may store the initial values of the speed setting data 167 as separate data from that of the speed setting data 167.

The drive control section 153 acquires the conditions relating to the number of the sheets S to manufacture, the kind of the sheets S, the color of the sheets S, and the like from the manufacturing conditions 162 (step SA4) and drives the sheet manufacturing section 101 to start the manufacturing of the sheets S (step SA5).

When the manufacturing of the sheets S is started, the information acquisition section 152 acquires the state information 168 based on the detection values of each of the sensors acquired by the detection control section 151 (step SA6). For example, the information acquisition section 152 extracts the detection values of the sensors set in advance from the detection values acquired by the detection control section 151 and processes the detection values into a set data format to generate the state information 168. The information acquisition section 152 adds the acquired state information to the state information 168 already stored in the second memory section 160. Accordingly, the state information 168 is accumulated during the operation of the sheet manufacturing section 101.

The information acquisition section 152 determines whether or not the data contained in the state information 168 is sufficient (step SA7). In step SA7, the information acquisition section 152 determines whether or not the number of items of data contained in the state information 168 reaches a threshold at which it is possible to transmit the state information S10 to the control device 200. The threshold, in this case, is contained in the basic setting data 161, for example.

When it is determined that the data of the state information 168 is insufficient (step SA7: NO), the second control section 150 determines whether or not the manufacturing of the sheets S is completed (step SA11). When the second control section 150 determines that the manufacturing of the number of the sheets S specified by the manufacturing conditions 162 is completed (step SA11: YES), the second control section 150 executes the stopping sequence (step SA12). In step SA12, the drive control section 153 stops the parts of the sheet manufacturing section 101 in the specified order.

When it is determined that the manufacturing of the sheets S is not complete (step SA11: NO), the second control section 150 returns to step SA6 and acquires the state information using the information acquisition section 152.

When the information acquisition section 152 determines that the data of the state information 168 is sufficient (step SA7: YES), the communication control section 157 transmits the state information S10 using the second communication section 118 (step SA8).

The control device 200 receives the state information S10 using the first communication section 201 (step SB1) and executes a learning process based on the received state information S10 (step SB2). The learning process of step SB2 will be described later with reference to FIG. 12.

The control device 200 transmits the update data S15 generated using the learning process to the sheet manufacturing apparatus 100 using the first communication section 201 (step SB3).

The sheet manufacturing apparatus 100 receives the update data S15 using the second communication section 118 (step SA9). The updating section 159 of the second control section 150 updates the control expression 164 based on the update data S15 received using the second communication section 118 (step SA10) and transitions to step SA11.

Figure 9:
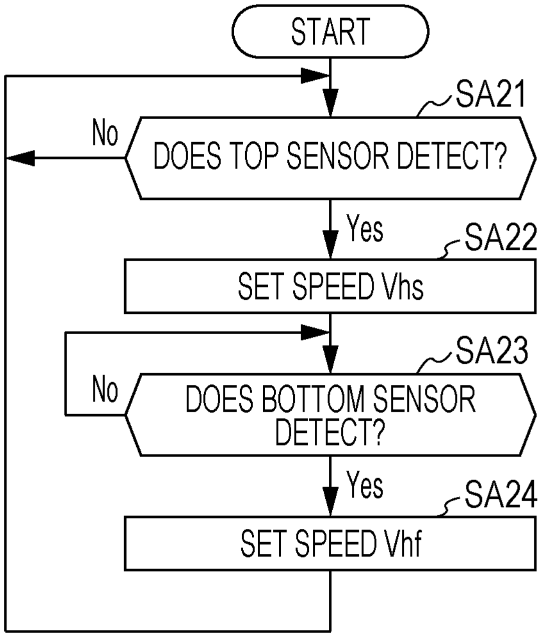
FIG. 9 is a flowchart illustrating the operations of the sheet manufacturing apparatus.
Figure 10:
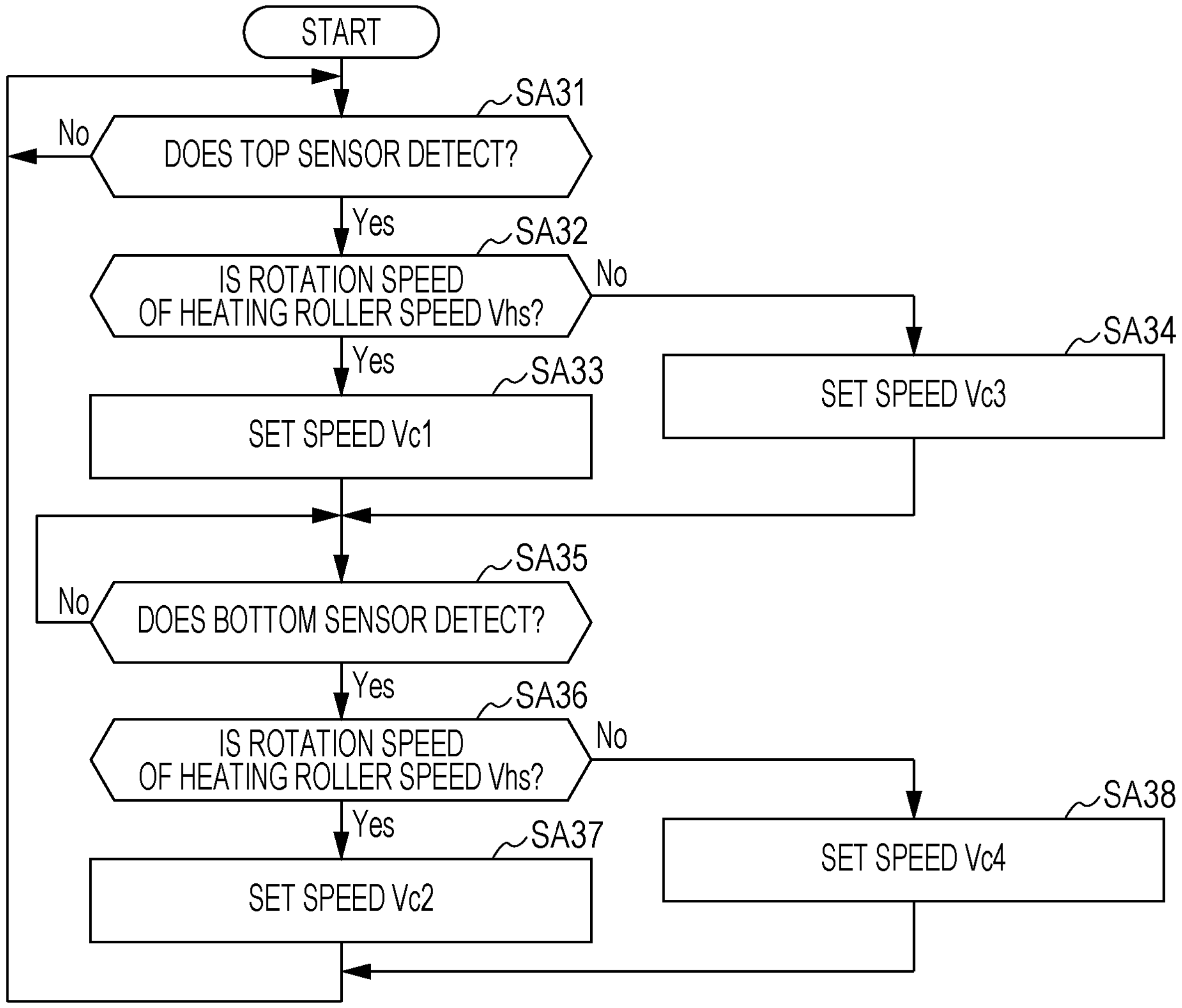
FIG. 10 is a flowchart illustrating the operations of the sheet manufacturing apparatus.

FIGS. 9 and 10 are flowcharts illustrating the operations of the sheet manufacturing apparatus 100 and illustrate the operations relating to the transport speed of the transport target matter FM. In detail, the control of the pressurizing roller drive section 341, the heating roller drive section 342, and the transport roller drive section 343 by the drive control section 153 is illustrated.

Here, a description will be given of an outline of the rotation speed control of the heating rollers 86.

The initial values of the transport speed V1 and the transport speed V2 are set such that transport speed V1>transport speed V2. In this case, the rotation speed R2 may be the speed Vhs set in the speed setting data 167 and may be another speed. When the transporting of the second web W2 and the pressurized sheet SS1 is started by the pressurizing section 82 and the heating section 84, since transport speed V1>transport speed V2, the length of the pressurized sheet SS1 in the first buffer portion 801 gradually becomes longer. The first tension roller 811 moves in the D direction in accordance with the elongation of the pressurized sheet SS1 in the first buffer portion 801 and the first bottom sensor 312 detects the first tension roller 811. Since the drive control section 153 uses the detection as a trigger to shorten the pressurized sheet SS1 in the first buffer portion 801, the drive control section 153 switches the rotation speed R2 to the speed Vhf of the speed setting data 167. Since transport speed V1<transport speed V2 due to this switching, the pressurized sheet SS1 in the first buffer portion 801 is shortened. The first tension roller 811 moves in the U direction in accordance with the shortening of the pressurized sheet SS1 and the first top sensor 311 detects the first tension roller 811. Since the drive control section 153 uses the detection of the first top sensor 311 as a trigger to lengthen the pressurized sheet SS1 in the first buffer portion 801, the drive control section 153 switches the rotation speed R2 to the speed Vhs which is the low speed.

In this manner, the drive control section 153 maintains the length of the pressurized sheet SS1 in the first buffer portion 801 within a predetermined range by switching the rotation speed R2 of the heating rollers 86 between low speed and high speed in a stepwise manner.

In step SA5, the drive control section 153 sets all of the rotation speeds R1, R2, and R3 to the initial values set in the basic setting data 161 and drives the pressurizing roller drive section 341, the heating roller drive section 342, and the transport roller drive section 343.

In the operations illustrated in FIG. 9, the drive control section 153 determines whether or not the first tension roller 811 is detected by the first top sensor 311 based on the detection value of the first top sensor 311 acquired by the detection control section 151 (step SA21).

When the first top sensor 311 does not detect the first tension roller 811 (step SA21: NO), the drive control section 153 waits.

When the first top sensor 311 detects the first tension roller 811 (step SA21: YES), the drive control section 153 sets the rotation speed R2 to the speed Vhs (step SA22).

Subsequently, the drive control section 153 determines whether or not the first bottom sensor 312 detects the first tension roller 811 (step SA23). When the first bottom sensor 312 does not detect the first tension roller 811 (step SA23: NO), the drive control section 153 waits.

When the first bottom sensor 312 detects the first tension roller 811 (step SA23: YES), the drive control section 153 sets the rotation speed R2 to the speed Vhf (step SA24).

The second control section 150 controls the rotation speed R3 of the transport section 88 in the same manner. Here, a description will be given of an outline of the rotation speed control of the transport section 88.

The initial values of the transport speed V2 and the transport speed V3 are set such that transport speed V2>transport speed V3. When the transporting of the pressurized sheet SS1 is started, since transport speed V2>transport speed V3, the length of the heated sheet SS2 in the second buffer portion 802 gradually becomes longer. The second tension roller 812 moves in the D direction in accordance with the elongation of the heated sheet SS2 in the second buffer portion 802 and the second bottom sensor 316 detects the first tension roller 811.

Since the drive control section 153 uses the detection as a trigger to shorten the heated sheet SS2 in the second buffer portion 802, the drive control section 153 switches the rotation speed R3 to a high speed such that transport speed V2<transport speed V3. Here, when the rotation speed R2 is the speed Vhs of the speed setting data 167, the drive control section 153 sets the rotation speed R3 to the speed Vc2. When the rotation speed R2 is the speed Vhf, the drive control section 153 sets the rotation speed R3 to the speed Vc4.

Due to transport speed V2<transport speed V3, the heated sheet SS2 shortens in the second buffer portion 802. The second tension roller 812 moves in the U direction in accordance with the shortening of the heated sheet SS2 and the second top sensor 315 detects the second tension roller 812. Since the drive control section 153 uses the detection of the second top sensor 315 as a trigger to lengthen the heated sheet SS2 in the second buffer portion 802, the drive control section 153 switches the rotation speed R3 to a low speed such that transport speed V2>transport speed V3. When the rotation speed R2 is the speed Vhs, the drive control section 153 sets the rotation speed R3 to the speed Vc1. When the rotation speed R2 is the speed Vhf, the drive control section 153 sets the rotation speed R3 to the speed Vc3.

In this manner, the drive control section 153 maintains the length of the heated sheet SS2 in the second buffer portion 802 within a predetermined range by switching the rotation speed R3 of the transport section 88 between low speed and high speed in a stepwise manner corresponding to the rotation speed R2 of the heating rollers 86.

The drive control section 153 determines whether or not the second top sensor 315 detects the second tension roller 812 based on the detection value of the second top sensor 315 acquired by the detection control section 151 (step SA31). When the second top sensor 315 does not detect the second tension roller 812 (step SA31: NO), the drive control section 153 waits.

When the second top sensor 315 detects the second tension roller 812 (step SA31: YES), the drive control section 153 determines whether or not the rotation speed R2 is set to the speed Vhs (step SA32). When the rotation speed R2 is set to the speed Vhs (step SA32: YES), the drive control section 153 sets the rotation speed R3 to the speed Vc1 (step SA33). When the rotation speed R2 is not set to the speed Vhs (step SA32: NO), since the rotation speed R2 is the speed Vhf, the drive control section 153 sets the rotation speed R3 to the speed Vc3 (step SA34).

Subsequently, the drive control section 153 determines whether or not the second bottom sensor 316 detects the second tension roller 812 (step SA35). When the second bottom sensor 316 does not detect the second tension roller 812 (step SA35: NO), the drive control section 153 waits.

When the second bottom sensor 316 detects the second tension roller 812 (step SA35: YES), the drive control section 153 determines whether or not the rotation speed R2 is set to the speed Vhs (step SA36). When the rotation speed R2 is set to the speed Vhs (step SA36: YES), the drive control section 153 sets the rotation speed R3 to the speed Vc2 (step SA37). When the rotation speed R2 is not set to the speed Vhs (step SA36: NO), since the rotation speed R2 is the speed Vhf, the drive control section 153 sets the rotation speed R3 to the speed Vc4 (step SA38).

Figure 11:
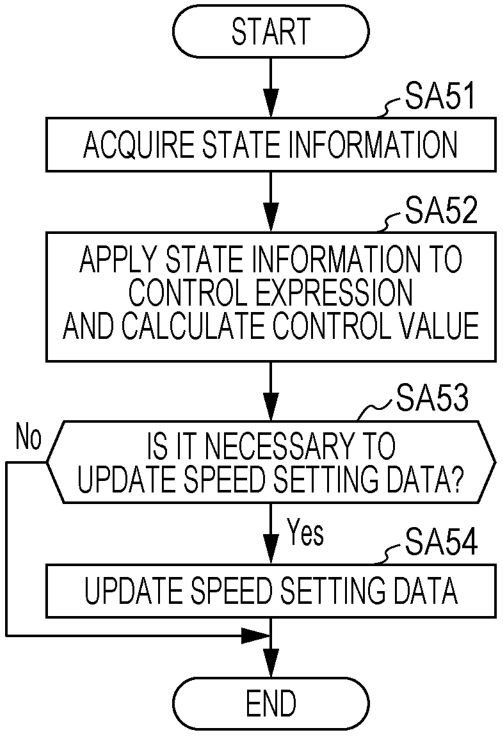
FIG. 11 is a flowchart illustrating the operations of the sheet manufacturing apparatus.

FIG. 11 is a flowchart illustrating the operations of the sheet manufacturing apparatus 100 and illustrates the control based on the control expression 164. The operations illustrated in FIG. 11 are executed by the second control section 150 and are executed by the functions of the drive control section 153, for example.

The drive control section 153 acquires the state information (step SA51). In step SA51, the drive control section 153 may acquire the state information from the information acquisition section 152 and may read the state information 168 stored in the second memory section 160.

The drive control section 153 applies the state information acquired in step SA51 to the control expression 164 and calculates the control value (step SA52).

The control expression 164 is an operational expression which outputs a control value corresponding to a setting value of the speed setting data 167 with respect to an input of the state information, for example. When handling the speed setting data 167 exemplified in FIG. 6, the control value output by the control expression 164 is the value of a speed Vp, for example.

The speed setting data 167 of FIG. 6 contains the setting values Vp, Vhs, Vhf, and Vc1 to Vc4 for each of the rotation speeds R1, R2, and R3. Hypothetically, when a correlation is defined between the setting values of the speeds of the speed setting data 167, the control expression 164 may output one or more control values corresponding to any of the setting values of the speed setting data 167.

For example, it is possible to adopt a configuration in which a correlation of the following expressions (1) to (6) to each of the setting values of the speed setting data 167 is defined.

$$Vhs = Vp\times 0.95 \quad (1)$$

$$Vhf = Vp\times 1.05 \quad (2)$$

$$Vc1 = Vhs\times 0.95 \quad (3)$$

$$Vc2 = Vhs\times 1.05 \quad (4)$$

$$Vc3 = Vhf\times 0.95 \quad (5)$$

$$Vc4 = Vhf\times 1.05 \quad (6)$$

In this case, it is possible to determine the other setting values contained in the speed setting data 167 based on the setting value Vp. When modifying the setting value Vp, it is possible to modify all of the other setting values in accordance with the setting value Vp after modification. Therefore, the control expression 164 may be an operational expression which outputs one control value corresponding to the setting value Vp with respect to the input of the state information. The control expression 164 may be an operational expression which outputs a plurality of control values corresponding to each of the setting values of the speed setting data 167.

The drive control section 153 compares the control value calculated in step SA52 and the setting value of the speed setting data 167 to each other and determines whether or not it is necessary to update the speed setting data 167 (step SA53). When the difference between the setting value of the speed setting data 167 and the control value output by the control expression 164 exceeds a threshold, for example, the drive control section 153 determines a positive result.

When the drive control section 153 determines that it is not necessary to update the speed setting data 167 (step SA53: NO), the drive control section 153 ends the present process.

When the drive control section 153 determines that it is necessary to update the speed setting data 167 (step SA53: YES), the drive control section 153 updates the speed setting data 167 (step SA54) and ends the present process. In step SA54, the drive control section 153 may update the speed setting data 167 after causing the second memory section 160 to store the initial values of the speed setting data 167 without overwriting.

Figure 12:
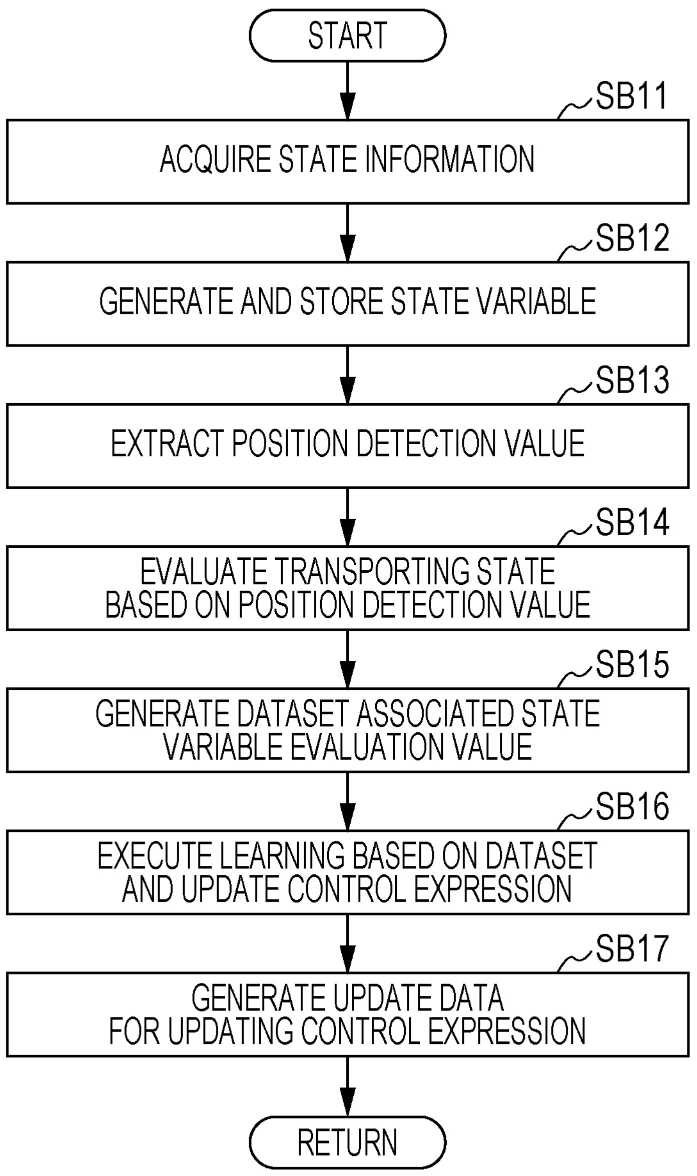
FIG. 12 is a flowchart illustrating the operations of the control device.

FIG. 12 is a flowchart illustrating the operations of the control device 200 and illustrates, in detail, the learning process indicated in step SB2 of FIG. 8.

The state variable acquisition section 211 acquires the state information S10 transmitted by the sheet manufacturing apparatus 100 (step SB11) and generates the state variable 247 from the state information S10 and causes the first memory section 203 to store the state variable 247 (step SB12). The state variable 247 is information excluding the position detection value S1 of the state information S10, for example.

The state variable acquisition section 211 extracts the position detection value S1 from the state information S10 (step SB13). The evaluation section 213 evaluates the transporting state of the transport target matter FM based on the position detection value S1 extracted in step SB13 (step SB14). As described above, the evaluation section 213 outputs a value indicating whether or not the transporting state of the transport target matter FM is favorable or an evaluation value which is a value obtained by digitizing an evaluation.

The dataset generating section 215 associates the state variable 247 and the evaluation value output by the evaluation section 213 to generate the dataset 249 and causes the first memory section 203 to store the dataset 249 (step SB15). The learning section 217 executes the learning based on the dataset 249 and updates the control expression 243 (step SB16).

The update data generating section 219 generates the update data S15 corresponding to the control expression 243 updated by the learning section 217 (step SB17).

The control system 1 is configured such that the control device 200 is capable of communicating with the plurality of sheet manufacturing apparatuses 100. The state variable acquisition section 211 is capable of acquiring the state variable from the state information S10 received from each of the plurality of sheet manufacturing apparatuses 100.

The state variable acquisition section 211 identifies the sheet manufacturing apparatus 100 which is the transmission source that transmitted the state information S10 and causes the first memory section 203 to store the state variable 247 for each of the individual sheet manufacturing apparatuses 100. Alternatively, a configuration may be adopted in which a region is provided in a memory region of the first memory section 203 to correspond to each of the individual sheet manufacturing apparatuses 100 and the control expression 243, the position information 245, the state variable 247, and the dataset 249 are stored in each of the regions. In this case, it is possible to handle disturbances and individual differences in the motor or the like for each of the individual sheet manufacturing apparatuses 100.

The dataset generating section 215 may consolidate the state variables 247 acquired from the plurality of sheet manufacturing apparatuses 100 to generate the dataset 249. In this case, the control expression 164 used by the sheet manufacturing apparatus 100 is learned based on the state information S10 output by the other sheet manufacturing apparatuses 100. In this case, there is a merit in that multiple items of data may be used to perform the learning swiftly.

The state variable 247 contains information relating to one or more detection values of the speed detection value S2, the temperature detection value S3, the humidity detection value S4, the material detection value S5, the thickness detection value S6, and the differential pressure detection value S7. When the state variable 247 contains information relating to the temperature detection value S3 and the humidity detection value S4, the learning section 217 performs the learning using the dataset 249 which reflects the temperature and the humidity detected by the fourth temperature/humidity sensor 434. Here, the temperature detection value S3 and the humidity detection value S4 may contain the detection values of the first temperature/humidity sensor 431, the second temperature/humidity sensor 432, and the third temperature/humidity sensor 433.

When the state variable 247 contains the material detection value S5, the learning section 217 performs the learning using the dataset 249 which reflects the detection value of the ultrasonic wave sensor 441. When the state variable 247 contains the thickness detection value S6, the learning section 217 performs the learning using the dataset 249 which reflects the detection value of the second thickness sensor 452. The thickness detection value S6 may contain the detection value of the first thickness sensor 451. When the state variable 247 contains the differential pressure detection value S7, the learning section 217 performs the learning using the dataset 249 which reflects the detection values of the first differential pressure sensor 461 and the second differential pressure sensor 462.

As described above, the control device 200 executes the learning method as the learning device using the sheet manufacturing apparatus 100 serving as the transporting apparatus as the learning target. The sheet manufacturing apparatus 100 is provided with a first roller which transports the web-like or sheet-like transport target matter FM and the second roller disposed downstream of the first roller in the transport path FW. The sheet manufacturing apparatus 100 is provided with the drive control section 153 which controls at least one of the rotation speeds of the first roller and the second roller and a position detection section which detects the position of the transport target matter FM in a direction intersecting the transport path FW between the first roller and the second roller. The control device 200 is provided with the state variable acquisition section 211 which acquires the state variable and the detection result of the position detection section, the state variable being based on information of the state of the transport target matter FM and information of the environment to which the transport target matter FM is exposed. The state variable is information relating to factors which change the state of the transport target matter FM, for example. The control device 200 is provided with the learning section 217 which learns the operational expression for calculating the control value of the drive control section 153 based on the dataset 249 containing the state variable acquired by the state variable acquisition section 211 and the detection result of the position detection section. The operational expression learned by the learning section 217 is the control expression 243 and is used as the control expression 164 in the sheet manufacturing apparatus 100.

The first roller of the sheet manufacturing apparatus 100 is the pressurizing rollers 85, for example, and in this case, the second roller is the heating rollers 86 or the transport rollers 89. In this case, the position detection section is provided with the first top sensor 311 and the first bottom sensor 312. When the first roller is the heating rollers 86 and the second roller is the transport rollers 89, the second top sensor 315 and the second bottom sensor 316 correspond to the position detection section. The transport target matter FM is the second web W2, the pressurized sheet SS1, and the heated sheet SS2.

According to the control device 200, it is possible to use the control expression 164 learned based on the dataset 249 to control the rotation speed of the rollers which transport the transport target matter FM in the sheet manufacturing apparatus 100. Accordingly, even when the sheet manufacturing apparatus 100 is influenced by individual differences and disturbances in the motors, it is possible to appropriately control the transport speed of the transport target matter FM and it is possible to stably transport the transport target matter FM.

The control device 200 is provided with the evaluation section 213 which evaluates the transporting state of the transport target matter FM based on the detection result of the position detection section. The learning section 217 performs the learning using the dataset 249 containing the evaluation result of the evaluation section 213. Therefore, the sheet manufacturing apparatus 100 is capable of using the learned control expression 164 such that the transporting state of the transport target matter FM is an appropriate state. Therefore, it is possible to stably transport the transport target matter FM.

The control device 200 is provided with the first communication section 201 which communicates with the sheet manufacturing apparatus 100 and the state variable acquisition section 211 acquires the state variable 247 and the detection result of the position detection section from the information received by the first communication section 201. Therefore, the learning based on the state variable 247 is executed by the control device 200 and the sheet manufacturing apparatus 100 controls the transporting of the transport target matter FM using the control expression 164 reflecting the learning. Therefore, it is possible to realize the control reflecting the learning without putting the processing load relating to the learning on the sheet manufacturing apparatus 100.

For example, in the configuration in which the plurality of sheet manufacturing apparatuses 100 and the control device 200 are capable of communicating with each other, the control device 200 learns the control expressions 243 applied to each of the sheet manufacturing apparatuses 100 based on the state variables 247 acquired from each of the sheet manufacturing apparatuses 100. Therefore, it is possible to perform learning optimized to each of the individual sheet manufacturing apparatuses 100 on the control expressions 243.

The state variable acquisition section 211 acquires the information relating to the humidity and the temperature of the transport path FW as the state variable. For example, the state variable acquisition section 211 acquires the humidity and/or the temperature of the transport path FW detected by the fourth temperature/humidity sensor 434 as the state variable. Therefore, it is possible to learn the correlation between at least one of the humidity and the temperature which influence the state of the transport target matter FM and the transporting state of the transport target matter FM and to appropriately control the rotation speeds of the rollers.

The operational expression learned by the learning section 217 is an expression for calculating the control value relating to the rotation speed of the second roller. The sheet manufacturing apparatus 100 calculates the control value relating to the rotation speed of the second roller based on the control expression 164. Therefore, it is possible to stabilize the transporting state of the transport target matter FM between the first roller and the second roller.

The first top sensor 311, the first bottom sensor 312, the second top sensor 315, and the second bottom sensor 316 serving as the position detection section may be proximity sensors or encoders. The position of the transport target matter FM in the first buffer portion 801 and/or the second buffer portion 802 is appropriately detected, the learning based on the detection result is executed, and it is possible to obtain stabilization of the transporting of the transport target matter FM.

The state variable acquired by the state variable acquisition section 211 may contain the detection values of the first differential pressure sensor 461 and/or the second differential pressure sensor 462 serving as the pressure sensors which detect the pressure of the exhaust carrying the feedstock. The detection value of the first differential pressure sensor 461 reflects the state of the blower which <generates> an air current in the inner portion of the sheet manufacturing section 101, in particular, the detection value reflects the operational state of the first dust-gathering blower 33. The detection value of the second differential pressure sensor 462 similarly reflects the operational state of the fourth dust-gathering blower 36. These detection values are acquired by the state variable acquisition section 211 and it is possible to stabilize the transporting of the transport target matter FM, taking into account the influence of individual differences of the first dust-gathering blower 33 and the fourth dust-gathering blower 36 by using the learning o the learning section 217.

The web forming section 102 is provided with the hollow drum section 61 which sieves the material containing the fibers and the mesh belt 72 which allows the material sieved by the drum section 61 to accumulate. The sheet manufacturing apparatus 100 is provided with the ultrasonic wave sensor 441 which detects the material in the inner portion of the drum section 61. The state variable acquisition section 211 acquires the detection value of the ultrasonic wave sensor 441 as the state variable. The detection value of the ultrasonic wave sensor 441 indicates the mixture MX in the inner portion of the drum section 61 and is an indicator of the amount of the mixture MX which descends from the drum section 61 onto the mesh belt 72. Therefore, due to the learning section 217 using the state variable 247 containing the detection value of the ultrasonic wave sensor 441 to perform the learning, it is possible to control the transport speed of the transport target matter FM and it is possible to realize more stable transporting of the transport target matter FM, taking into account the amount of the mixture MX per unit time which accumulates on the mesh belt 72.

The web forming section 102 is provided with the second thickness sensor 452 which measures the thickness of the second web W2. The state variable acquisition section 211 acquires the measurement value of the second thickness sensor 452 as the state variable. The detection value of the second thickness sensor 452 is an indicator of the thickness of the second web W2 and the pressurized sheet SS1, the heated sheet SS2, and the sheet S which are manufactured from the second web W2. Therefore, due to the learning section 217 using the state variable 247 containing the detection value of the second thickness sensor 452 to perform the learning, it is possible to control the transport speed of the transport target matter FM and it is possible to realize more stable transporting of the transport target matter FM, taking into account the influence of the thickness of the transport target matter FM.

2. Second Embodiment

Hereinafter, a description will be given of the second embodiment.

In the first embodiment, a description is given of a configuration in which in the control system 1, the state information S10 is transmitted from the sheet manufacturing apparatus 100 to the control device 200, the control device 200 performs the learning using the learning section 217, and the update data S15 corresponding to the learning result is transmitted to the sheet manufacturing apparatus 100.

In the second embodiment, a description is given of an example in which the sheet manufacturing apparatus 100 performs the learning and updates the control expression 164.

Figure 13:
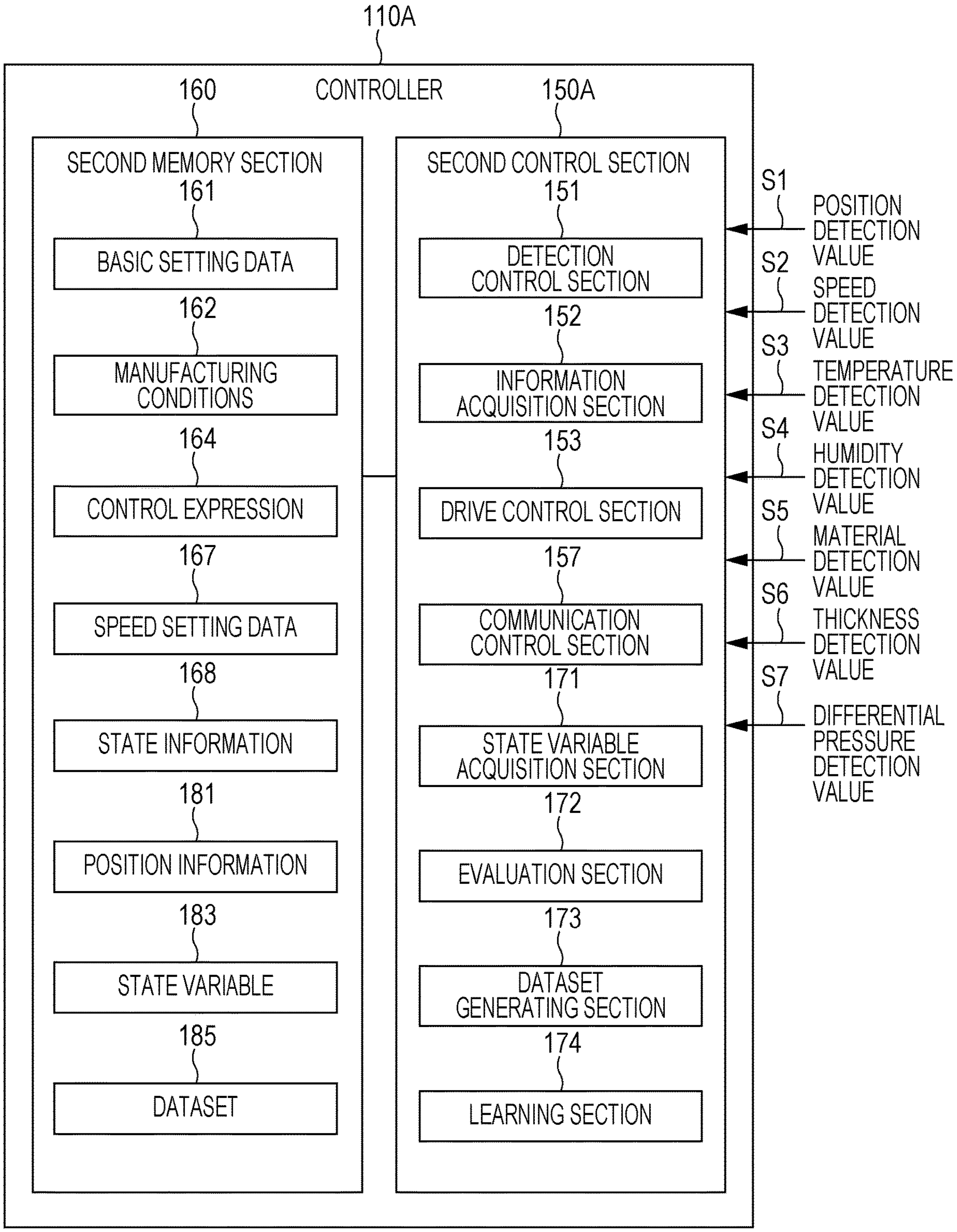
FIG. 13 is a functional block diagram of a controller of a second embodiment.

FIG. 13 is a functional block diagram of a controller 110A which is provided in the sheet manufacturing apparatus 100 of the second embodiment. In FIG. 13, configuration parts shared with the first embodiment will be given the same reference numerals and the description thereof will be omitted.

It is possible to realize a second control section 150A included in the controller 110A by a processor executing a program in the same manner as the second control section 150. The second control section 150A is provided with the detection control section 151, the information acquisition section 152, the drive control section 153, the communication control section 157, and the updating section 159.

The second control section 150A is provided with a state variable acquisition section 171, an evaluation section 172, a dataset generating section 173, a learning section 174, and an update data generating section 175.

The state variable acquisition section 171 functions in the same manner as the state variable acquisition section 211, using the state information 168 acquired by the information acquisition section 152 as a target. In other words, the state variable acquisition section 171 acquires a state variable 183 from the state information 168 and causes the second memory section 160 to store the state variable 183. The state variable acquisition section 171 extracts the position detection value S1 from the state information 168, acquires position information 181, and causes the second memory section 160 to store the position information 181.

The position information 181 is similar information to the position information 245. The state variable 183 is similar information to the state variable 247.

The evaluation section 172 evaluates the transporting state of the transport target matter FM based on the position information 181 in the same manner as the evaluation section 213. The evaluation result of the evaluation section 172 is either positive or negative, or alternatively, is a number evaluating the transporting state of the transport target matter FM.

The dataset generating section 173 associates the state variable 183 with the evaluation result of the evaluation section 172 to generate a dataset 185 in the same manner as the dataset generating section 215. The dataset 185 is data for the learning section 174 to learn.

The dataset 185 contains data relating to the evaluation result of the evaluation section 172 and the state variable 183 corresponding to the position information 181 evaluated by the evaluation section 172. In other words, data in which the state of the sheet manufacturing section 101 indicated by the state variable 183 and the evaluation result of the transporting state of the transport target matter FM in this state are associated with each other.

The learning section 174 performs machine learning using the dataset 185 and updates the control expression 164.

The learning executed by the learning section 174 is similar to that of the learning section 217. For example, the learning section 174 executes so-called supervised learning, uses the evaluation result of the evaluation section 172 as labels, learns the data associated with the labels, and updates the control expression 164. The learning section 174 may extract the dataset corresponding to a specific evaluation result from the dataset 185 and execute so-called unsupervised learning. The learning section 174 may execute semi-supervised learning and may execute so-called transfer learning using a trained learning model. For example, the learning section 174 may execute a multiple linear regression model for a plurality of the state variables 183 contained in the dataset 185 and may further execute deep learning.

In the configuration illustrated in FIG. 13, the sheet manufacturing apparatus 100 performs the learning of the control expression 164 based on the acquired information relating to the state of the sheet manufacturing section 101 using the learning section 174 provided in the second control section 150A. The learning section 174 performs the learning based on the dataset 185 containing at least one of the position detection value S1, the speed detection value S2, the temperature detection value S3, the humidity detection value S4, the material detection value S5, the thickness detection value S6, and the differential pressure detection value S7. Therefore, it is possible to learn and update the control expression 164 using the information relating to items influencing, of the states of the sheet manufacturing section 101, particularly the state of the transport target matter FM. Therefore, each of the sheet manufacturing apparatuses 100 is capable of independently and autonomously executing the learning in order to stabilize the transporting of the transport target matter FM.

In this manner, the sheet manufacturing apparatus 100 serving as the fibrous feedstock recycling apparatus of the second embodiment is provided with the web forming section 102 which forms a web from a feedstock containing fibers and the web transport section 103 which transports the web formed by the web forming section 102. The sheet manufacturing apparatus 100 of the second embodiment is provided with the controller 110A. The web transport section 103 is provided with a first roller which transports the web and the second roller disposed downstream of the first roller in the transport path FW of the web. The sheet manufacturing apparatus 100 is provided with a position detection section which detects the position of the web in a direction intersecting the transport path FW between the first roller and the second roller. The second control section 150A is provided with the drive control section 153 which controls at least one of the rotation speed of the first roller and the rotation speed of the second roller.

The second control section 150A is provided with the state variable acquisition section 171 which acquires the state variable relating to at least one of the states of the web forming section 102 and the web transport section 103. The second control section 150A is provided with the learning section 174 which learns the control expression 164 for calculating the control value of the drive control section 153 based on the dataset 185 containing the state variable 183 acquired by the state variable acquisition section 171 and the detection result of the position detection section. The second control section 150A controls at least one of the first roller and the second roller using the drive control section 153 based on the control value calculated based on the control expression 164.

Therefore, since the control expression 164 is learned based on the information relating to items influencing the state of the transport target matter FM and the transporting of the transport target matter FM is controlled using the control value obtained by the control expression 164, it is possible to stably transport the transport target matter FM.

3. Other Embodiments

The embodiments described above are merely specific modes which embody the present disclosure, do not limit the present disclosure, and as indicated hereinafter, for example, may be embodied in various modes within a scope not departing from the gist of the present disclosure.

In the embodiments, although a configuration is exemplified in which the transport target matter FM transported by the molding section 80 and the transport section 88 is formed from the feedstock MA by the sheet manufacturing section 101, the present disclosure is not limited thereto. For example, the present disclosure may be applied to a transporting apparatus provided with transport rollers which transport web-like or sheet-like transport target matter. For example, the present disclosure may be applied to an apparatus provided with transport rollers which transport paper, fabric, non-woven fabric, sheets of synthetic resin, or the like.

The sheet manufacturing apparatus 100 is not limited to manufacturing the sheet S and may be configured to manufacture a board-like or web-like manufactured product configured by hard sheets or layered sheets. The manufactured product is not limited to paper and may be a non-woven fabric. The properties of the sheet S are not particularly limited, and the sheet S may be paper usable as recording paper (for example, so-called PPC paper sheets) with the purpose of writing or printing, and may be wallpaper, wrapping paper, colored paper, drawing paper, Bristol board, or the like. When the sheet S is a non-woven fabric, in addition to a general non-woven fabric, fiberboard, tissue paper, kitchen paper, a cleaner, a filter, a liquid absorbent material, a sound absorber, a buffer material, a mat, or the like may be used.

In the embodiment, as the transporting apparatus and the fibrous feedstock recycling apparatus of the present disclosure, a description is given of the sheet manufacturing apparatus 100 of a dry system in which a material is obtained by defibrating the feedstock in a gas and the sheet S is manufactured using the material and a resin. The application target of the present disclosure is not limited thereto, and the present disclosure may also be applied to a so-called sheet manufacturing apparatus of a wet system which causes a feedstock containing fibers to dissolve or float in a medium such as water and processes the feedstock into sheets. It is also possible to apply the present disclosure to a sheet manufacturing apparatus of an electrostatic system in which a material containing fibers defibrated in a gas is caused to adhere to a surface of a drum using static electricity and the feedstock adhered to the drum is processed into sheets.

What is claimed is:

1. A learning device using, as a learning target, a transporting apparatus provided with a first roller which transports web-like or sheet-like transport target matter and a second roller disposed downstream of the first roller in a transport path of the transport target matter, a rotation control section which controls at least one of a rotation speed of the first roller and a rotation speed of the second roller, and a position detection section which detects a position of the transport target matter in a direction intersecting the transport path between the first roller and the second roller, the learning device comprising:

a state variable acquisition section which acquires a state variable and a detection result of the position detection section, the state variable being based on information of a state of the transport target matter and information of an environment to which the transport target matter is exposed; and a learning section which learns an operational expression for calculating a control value of the rotation control section based on a dataset containing the state variable acquired by the state variable acquisition section and the detection result of the position detection section.

2. The learning device according to claim 1, further comprising:

an evaluation section which evaluates a transporting state of the transport target matter based on a detection result of the position detection section, wherein the learning section performs learning using the dataset containing an evaluation result of the evaluation section.

3. The learning device according to claim 1, further comprising:

a communication section which communicates with the transporting apparatus, wherein the state variable acquisition section acquires the state variable and the detection result of the position detection section from information received by the communication section.

4. The learning device according to claim 1, wherein the state variable acquisition section acquires information relating to a humidity to which the transport target matter is exposed as the state variable.

5. The learning device according to claim 1, wherein the state variable acquisition section acquires information relating to a temperature to which the transport target matter is exposed as the state variable.

6. The learning device according to claim 1, wherein the operational expression is an expression for calculating the control value relating to the rotation speed of the second roller.

7. A fibrous feedstock recycling apparatus comprising:

a web forming section which forms a web from a feedstock containing fibers;

a web transport section which transports the web formed by the web forming section; and a control section, wherein the web transport section includes a first roller which transports the web and a second roller disposed downstream of the first roller in a transport path of the web, and a position detection section which detects a position of the web in a direction intersecting the transport path between the first roller and the second roller, the control section includes a rotation control section which controls at least one of a rotation speed of the first roller and a rotation speed of the second roller, a state variable acquisition section which acquires a state variable relating to a state of at least one of the web forming section and the web transport section, and a learning section which learns an operational expression for calculating a control value of the rotation control section based on a dataset containing the state variable acquired by the state variable acquisition section and a detection result of the position detection section, and the control section controls at least one of the first roller and the second roller using the rotation control section based on the control value calculated based on the operational expression.

8. The fibrous feedstock recycling apparatus according to claim 7, wherein the control value relating to the rotation speed of the second roller is calculated based on the operational expression.

9. The fibrous feedstock recycling apparatus according to claim 7, wherein the position detection section includes a proximity sensor installed between the first roller and the second roller or an encoder.

10. The fibrous feedstock recycling apparatus according to claim 7, wherein the state variable acquisition section acquires a humidity of the transport path as the state variable.

11. The fibrous feedstock recycling apparatus according to claim 7, wherein the state variable acquisition section acquires a temperature of the transport path as the state variable.

12. The fibrous feedstock recycling apparatus according to claim 7, further comprising:

a pressure sensor which detects a pressure of exhaust that carries the feedstock, wherein the state variable acquisition section acquires a detection value of the pressure sensor as the state variable.

13. The fibrous feedstock recycling apparatus according to claim 7, wherein the web forming section is provided with a hollow sieve portion which sieves a material containing fibers, an accumulating section which accumulates the material sieved by the sieve portion, and an ultrasonic wave sensor which detects the material in an inner portion of the sieve portion, and the state variable acquisition section acquires a detection value of the ultrasonic wave sensor as the state variable.

14. The fibrous feedstock recycling apparatus according to claim 7, wherein the web forming section is provided with a thickness measuring section which measures a thickness of the web, and the state variable acquisition section acquires a measurement value of the thickness measuring section as the state variable.

15. A learning method using, as a learning target, a transporting apparatus provided with a first roller which transports web-like or sheet-like transport target matter and a second roller disposed downstream of the first roller in a transport path of the transport target matter, in which the transporting apparatus controls a rotation speed of the first roller and a rotation speed of the second roller, the method comprising:

detecting a position of the transport target matter in a direction intersecting the transport path between the first roller and the second roller;

acquiring a state variable which changes a state of the transport target matter; and learning an operational expression for calculating a control value of the rotation speeds of the first roller and the second roller based on a dataset containing the detected position of the transport target matter between the first roller and the second roller and the state variable.

16. A non-transitory computer-readable storage medium storing a program configured to be executed by a computer which is provided with a first roller which transports web-like or sheet-like transport target matter and a second roller disposed downstream of the first roller in a transport path of the transport target matter, and which controls a rotation speed of the first roller and a rotation speed of the second roller, the program comprising:

an operational expression for calculating a control value of the rotation speeds of the first roller and the second roller, the operational expression being learned based on a dataset containing a position of the transport target matter in a direction intersecting the transport path detected between the first roller and the second roller and a state variable which changes a state of the transport target matter; and controlling the rotation speeds of the first roller and the second roller based on the control value calculated based on the operational expression.

* * * * *